United States Patent
Ruth et al.

(10) Patent No.: US 11,709,838 B2
(45) Date of Patent: Jul. 25, 2023

(54) ASSISTED QUERY BUILDING AND DATA RETRIEVAL

(71) Applicant: SKYLAND ANALYTICS INC., Niwot, CO (US)

(72) Inventors: Joseph David Ruth, Louisville, CO (US); David James Brick, Fort Collins, CO (US); Matthew Garrett Michnal, Denver, CO (US)

(73) Assignee: ID BUSINESS SOLUTIONS INC., Alameda, CA (US)

( * ) Notice: Subject to any disclaimer, the term of this patent is extended or adjusted under 35 U.S.C. 154(b) by 165 days.

(21) Appl. No.: 16/942,036

(22) Filed: Jul. 29, 2020

(65) Prior Publication Data

US 2021/0034617 A1     Feb. 4, 2021

Related U.S. Application Data

(60) Provisional application No. 62/881,805, filed on Aug. 1, 2019, provisional application No. 62/951,575, filed on Dec. 20, 2019, provisional application No. 63/040,403, filed on Jun. 17, 2020.

(51) Int. Cl.
    *G06F 16/2455*     (2019.01)
    *G06F 16/2457*     (2019.01)

(52) U.S. Cl.
    CPC .... *G06F 16/2455* (2019.01); *G06F 16/24575* (2019.01)

(58) Field of Classification Search
None
See application file for complete search history.

(56) References Cited

U.S. PATENT DOCUMENTS

| | | | | |
|---|---|---|---|---|
| 9,104,392 | B1* | 8/2015 | Dunagan | G06F 16/24575 |
| 2006/0167760 | A1* | 7/2006 | Chakraborty | G06Q 30/02 |
| | | | | 705/26.61 |
| 2013/0055060 | A1* | 2/2013 | Folsom | G06F 40/143 |
| | | | | 715/222 |
| 2014/0095462 | A1* | 4/2014 | Park | G06F 16/248 |
| | | | | 707/706 |
| 2015/0248462 | A1* | 9/2015 | Theeten | G06F 16/24524 |
| | | | | 707/688 |
| 2016/0025527 | A1* | 1/2016 | Kaiser | G01D 18/00 |
| | | | | 702/189 |
| 2018/0046676 | A1* | 2/2018 | Farr | G06F 16/2358 |

OTHER PUBLICATIONS

PCT, International Search Report and Written Opinion issued in International Patent Application No. PCT/US2020/044044 dated Oct. 28, 2020 (11 pages).

* cited by examiner

*Primary Examiner* — Christopher J Raab
(74) *Attorney, Agent, or Firm* — Patent Law Works LLP

(57) ABSTRACT

A generic query having a dynamic query parameter may be executed for a specified process. One or more expected parameters for the query are determined based on the dynamic query parameter and the process, where the one or more expected parameters are tagged to the dynamic query parameter for the process. One or more measured parameters are accessed based on the one or more expected parameters from one or more databases accessible over a network. The one or more measured parameters are returned responsive to the query.

17 Claims, 33 Drawing Sheets

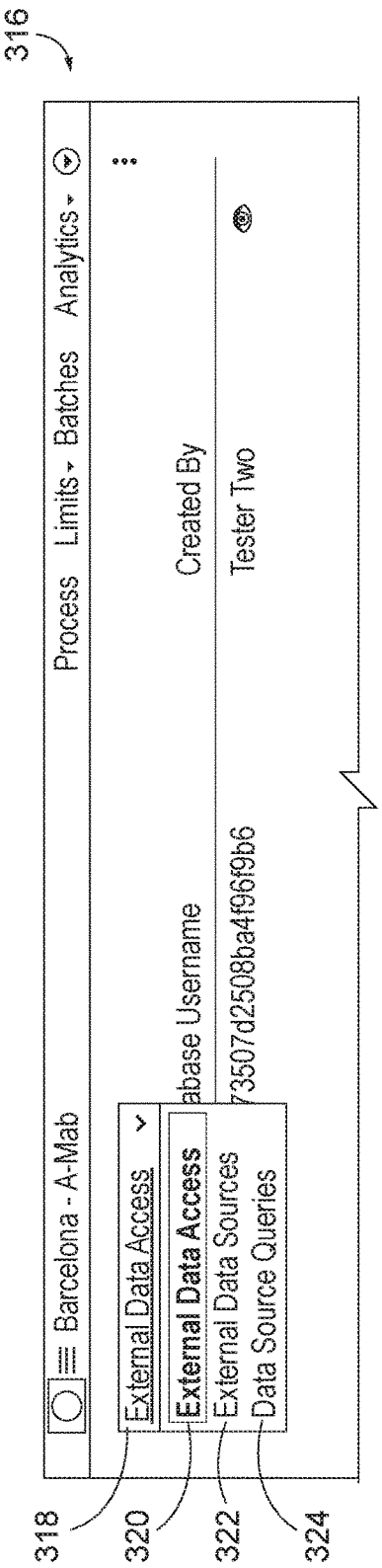

| | | | | |
|---|---|---|---|---|
| Name | Data Source | Description | Query | Test Query |
| BCN EBR Batch Data | BCN EBR | Batch information from the EBR | select batch_no, equip_id, batch_start_dt, batch_end_dt, equip_start_dt, equip_end_dt, prep_start_dt, prep_equip_id from Imp_ebr.batches | OK Tested: 21-Jul-2019 19:29 EDT |
| BCN EBR Materials Data | BCN EBR | Input materials from the EBR | select batch_no, material_lot, material_no, material_name, record_type, qty, vendor... ...and material_name in ('[@MATERIAL_NAME]') | OK Tested: 21-Jul-2019 19:42 EDT |
| BCN Historian Run Data | BCN Historian | Historian data for each run | select run_id, unit, phase, start_dt, end_dt from Imp_hist.hist_runs | OK Tested: 21-Jul-2019 19:31 EDT |
| BCN Historian Summary | BCN Historian | | select alias, unit, a.tag, avg(number_value) avg, min(number_value) min, max(number_value) max from Imp_hist.hist_alias a, Imp_hist.hist_trend t... | OK Tested: 21-Jul-2019 17:14 EDT |
| BCN Historian Trend | BCN Historian | | select alias, unit, a.tag, avg(number_value) avg, min(number_value) min, max(number_value) max from Imp_hist.hist_alias a, Imp_hist.hist_trend t... | OK Tested: 21-Jul-2019 16:19 EDT |
| BCN Lims Samples | BCN EBR | LIMS Sample data | select batch_id, sample_id, sample_dt from Imp_lims.samples | OK Tested: 21-Jul-2019 13:34 EDT |
| BCN Lims Test Results | BCN Lims | Test Result Values from LIMS | select batch_id, s.sample_id, material_id, sample_dt, sample_name, t.test_id, r.result_name, r.string_value, r.number_value, r.formatted_number... | OK Tested: 21-Jul-2019 19:43 EDT |

FIG. 8

| | | Placeholder Value Source | | | |
|---|---|---|---|---|---|
| | Literal Values | Data Entry | Queried from another data source | Derived values | Batch metadata |
| Example Value | APPROVED | "Parameter.Status" | "Parameter. Lot Number" | "Parameter. Calculation" | "@Market" |
| Query Data-Metadata Area | | | | | |
| Select columns | Yes | Yes, but not normal case | Yes | Yes | In some cases |
| Sources tables/systems | Yes | With an extra step | With an extra step | With an extra step | In some cases |
| Filter column selection | Yes | Yes, but not normal case | Yes | Yes | Yes |
| Filter values | Yes | Yes | Yes | Yes | Yes |

FIG. 9

Cambridge - A-Mab

Process Definition

SQL Server

| Parameter Name | Unit of Measure | Parameter Classes |
|---|---|---|
| Glucose | | |
| Glocose | | |
| Glucose String | | |
| One ph | | |
| One ph edited | | |
| Two ph | | |
| Two ph values | | |
| union datetime | | |
| union date numeric | | |
| nested | | |
| syntax | | |
| *complex ph* | | |
| union date | | |
| Non data soruc param | | |

> References
> Specials

---

Process  Limits ▾  Batches  Analytics ▾  ⊙

Prod < SQL Server                                                 ✕

| | |
|---|---|
| Name | complex ph |
| Description | Test batch is S0718 |
| Parameter Source | Queried |
| Data Source Query | Ora - 8 - complex ph |
| Batch ID Column | batch_id |
| Parameter Column | batch_id |
| Test Batch ID | S0718 |
| Query Status | PASS |
| Query Placeholder Fields | |
| TEST_ME | S0718 |
| EXTRA_FIELD | material_name |
| EXTRA_FIELD VALUE | Seed Media |
| Unit of Measure | |
| Data Type | numeric |
| Status | active |
| Parameter Classes | |
| Query Alias | |
| Reference URLs | Prod.Oracle.Copy.complex ph |
| Attachments | |
| Notes | |

[ Edit ]  [ Delete ]

Cambridge - A-Mab

Process Definition

| | | | |
|---|---|---|---|
| nested | | | |
| syntax | | | |
| complex ph | | | |
| union date | | | |
| Non data soruc param | | | |

⌄ References

| Parameter Name | Unit of Measure | Parameter Classes |
|---|---|---|
| Seed Salt Lot No | | |
| *Seed Salt Sample DT* | | |
| This one is inactive and shouldn't appear | | |
| Prod Lot | | |
| Reuse Reference - TCC day 4 | | |
| Batch Start | | |
| Batch End | | |
| Equip ID Lookup | | |

> Metadata Qty
> Specials

> Oracle

---

Process  Limits ▾  Batches  Analytics ▾  ⊙

Prod < SQL Server < References   ✕

| | |
|---|---|
| Name | Seed Salt Sample DT |
| Description | Queried |
| Parameter Source | Ora - Refer RM Lot Sample |
| Data Source Query | batch_id |
| Batch ID Column | sample_dt |
| Parameter Column | S0606 |
| Test Batch ID | PASS |
| Query Status | |
| Query Placeholder Fields | |
| RM_NAME | LMP Seed Salt Mix |
| RM_LOT_ID | "Prod.Oracle.References. Seed Salt Lot No" LAMPIUM_SEED |
| PRODUCT_NAME | |
| Unit of Measure | datetime |
| Data Type | active |
| Status | |
| Parameter Classes | |
| Query Alias | |
| Reference URLs | Pro.Oracle.Copy.References. Seed Salt Sample DT |
| Attachments | |
| Notes | |

[Edit]

FIG. 10D

Cambridge - A-Mab

Process  Limits▼  Batches  Analytics▼

Process Definition

Prod < SQL Server < References  ✕

- nested
- syntax
- complex ph
- union date
- Non data soruc param
- ▼ References

| Parameter Name | Unit of Measure | Parameter Classes |
|---|---|---|
| Seed Salt Lot No | | |
| Seed Salt Sample DT | | |
| This one is inactive and shouldn't appear | | |
| Prod Lot | | |
| Reuse Reference - TCC day 4 | | |
| Batch Start | | |
| Batch End | | |
| *Equip ID Lookup* | | |

- ▶ Metadata Qty
- ▶ Specials
- ▶ Oracle

Equip is SB3202 for S0606, S0704, S0801

* Batch ID Column
batch_no ▾

* Parameter Column
equip_id ▾

* Test Batch ID
S0606    Query Placeholder Fields — 460, 474

EQUIP_ID
S0718 — 476

EQUIP_ID patameter test field
"@Equipment ID" — 356

START_DT
"Prod.Oracle.References.Batch Start"

START_DT parameter test field
2015-06-06 09:18

END_DT
"Prod.Oracle.References.Batch End"

[ Save ]  Cancel

| Barcelona - A-Mab | | | Process  Limits▾  Batches  Analytics▾ ⊙ |
|---|---|---|---|
| Process Definition | | | Prod                                    × |
| ⋗ N-1 | | | |
| ⌄ Prod | | | Name | Bioreactor |
| Parameter Name | Unit of Measure | Parameter Classes | Description |
| *Bioreactor* | | | Parameter Source | Queried |
| Batch Start DT | | | Data Source Query | BCN EBR Batch Data |
| Batch End DT | | | Batch ID Column | batch_no |
| ⋗ Inputs | | | Parameter Column | equip_id |
| ⌄ Culture | | | Test Batch ID | S0606 |
| Parameter Name | Unit of Measure | Parameter Class | Query Status | PASS |
| GF Time | hours | KPP | Unit of Measure | |
| Duration | days | WC-CPP | Data Type | text |
| | | | Status | active |
| ⋗ ⋇ Offline | | | Parameter Classes | |
| ⌄ Process | | | Query Alias | Prod.Bioreactor |
| Parameter Name | Unit of Measure | Parameter Class | Reference URLs |
| BRX Start DT | | | Attachments |
| BRX End DT | | | Notes |
| Average OUR | | | |
| Min OUR | | | [ Edit ] |

FIG. 11C 404
412

○ ≡ Barcelona - A-Mab                                    Process  Limits▾ Batches  Analytics▾ ⊙

Batch Entry > Prod > S0606 (10-Jul-2019)        Metadata Approved  Show                    ...

| Process | Parameter Refresh Status | | | | ✕ |
|---|---|---|---|---|---|
| | Status | Parameter | Daily Source Query | Elapsed Time | Result |
| BRX Start DT ◆ ◉ | ERROR | Average OUR | BCN Historian Trend | 00:01 | SQL Statement is invalid |
| 06-Jun-2015 09:18 | | | | | |
| BRX End DT ◆ ◉ | ⚠ SQL Statement is invalid | | | | |
| 11-Jun-2015 11:00 | Select avg from (select alias, unit, a.tag, avg(number_value) avg, | | | | |
| Average OUR ◆ ◉ | min(number_value) min, max(number_value) max from | | | | |
| | Imp_hist.hist_alias a, Imp_hist.hist_trend t where t.tag=a.tag and | | | | |
| Min OUR ◆ ◉ | alias='OUR' and unit='SB3202' and time>=to_timestamp('06-Jun-2015 | | | | |
| | 09:18','DD-MM-YYYY HH24:MI:SS') and time<=to_timestamp('11-Jun- | | | | |
| Max OUR ◆ ◉ | 2015 11:00','DD-MM-YYYY HH24:MI:SS') group by a.alias, a.unit, | | | | |
| | a.tag) as pims_query where alias='S0606' | | | | |
| Temp ◆ ◉ | | | | | |
| °C | ⟲ | | | | |
| pH ◉ | | | | | |

Submit  Save & Exit                                              ⟲ Query all parameters

FIG. 11D

Barcelona - A-Mab

Process Definition

∨ Culture

| Parameter Name | Unit of Measure | Parameter Class |
|---|---|---|
| GF Time | hours | KPP |
| Duration | days | WC-CPP |

> ≡ Offline

∨ Process

| Parameter Name | Unit of Measure | Parameter Class |
|---|---|---|
| BRX Start DT | | |
| BRX End DT | | |
| *Average OUR* | | |
| Min OUR | | |
| Max OUR | | |
| Temp | °C | WC-CPP |
| pH | | WC-CPP |
| Max pCO2 | mmHg | WC-CPP |
| Peak VCC | x10⁶ cells/mL | KPA |
| > iPC | | |

> Harv

---

Prod < Culture < Process                                    ×

| | |
|---|---|
| Name | Average OUR |
| Description | |
| Parameter Source | Queried |
| Data Source Query | BCN Historian Trend |
| Batch ID Column | alias |
| Parameter Column | avg |
| Test Batch ID | OUR |
| Query Status | PASS |
| Query Placeholder Fields | |
| ALIAS | OUR |
| UNIT | "Prod.Bioreactor" |
| START_TIME | "Prod.Culture.Process.BRX Start DT" |
| END_TIME | "Prod.Culture.Process.BRX End DT" |
| Unit of Measure | |
| Data Type | numeric |
| Status | active |
| Parameter Classes | |
| Query Alias | Prod.Culture.Process.Average OUR |
| Reverence URLs | |
| Attachments | |

[Edit] [Delete]

Cambridge - A-Mab — Home Process Limits▾ Batches Analytics▾ SkylandPIMS

Batch Entry  Prod  P0618 (2019-11-11 13:22)
USA

Metadata Approved  Show

[ ] mOsm/Kg

> ▦ Lampium Seed    ↻ Row Status ○○○○○
> ▦ All             ↻ Row Status ○●○○○
> ▦ Glucose         ↻ Row Status ○○○○○
> ▦ LMP Salt Mix    ↻ Row Status ○○○○○
> ▦ Bad convert Test
> ▦ Inputs PH       ↻ Row Status ○○○○○

Culture

GF Time ⊙  [ ] hours

Duration ⊙  [ ]

↻ Query all parameters

[Submit]  Save & Exit

550 — (overall frame)
564 — (mOsm/Kg field)
552 — (Lampium Seed row)

All 0 warnings, 0 errors found

| | A | B | C | D | E | F | G | H |
|---|---|---|---|---|---|---|---|---|
| | Status | Material # (ID) | Material Lot (ID) | Material Name | Qty | Dispense Time | Vendor | Vendor Lot |
| 1 | Draft | SBRX3457 | S0613 | LAMPIUM_SEED | 241.0 | 2015-06-18 15:49 | Internal | S0613 |
| 2 | Draft | GLU1023 | GLUC5440 | Glucose | 78.0 | | SUGAR[!], LLC | GL378333 |
| 3 | Draft | SLT0603 | SLTP6536 | LMP Salt Mix | 4.0 | | Get Salty, Inc. | S235P9532 |
| 4 | Draft | SLT0603 | SLTP6534 | LMP Salt Mix | 1.0 | | Get Salty, Inc. | S235P9532 |
| 5 | Draft | SLT0603 | SLTP6535 | LMP Salt Mix | 1.0 | | Get Salty, Inc. | S235P9532 |
| 6 | Draft | EC2532 | ECIB0001 | E. Coli | 1.0 | | Chipotle | BUR21359 |
| 7 | Draft | PU94203 | PUP0618 | Plutonium | 0.0 | | SKMW Inc | PUP0618 |
| 8 | Draft | S0613 | SBRX3457 | | | | | |
| 9 | Draft | GLUC5440 | GLU1023 | | | | | |
| 10 | Draft | SLTP6536 | SLT0603 | | | | | |
| 11 | Draft | SLTP6534 | SLT0603 | | | | | |
| 12 | Draft | SLTP6535 | SLT0603 | | | | | |
| 13 | Draft | ECIB0001 | EC2532 | | | | | |
| 14 | Draft | PUP0618 | PU94203 | | | | | |
| 15 | | | | | | | | |
| 16 | | | | | | | | |
| 17 | | | | | | | | |
| 18 | | | | | | | | |

Save & Return

≡ Cambridge - A-Mab
USA
Batch Entry  Prod  P0618 (2019-11-11 13:22)

Home  Process  Limits▼  Batches  Analytics▼  SkylandPIMS ▶

Metadata Approved  Show

Culture

GF Time 👁
[          ] hours

Duration 👁
[          ] days

▪▪ Online
↻ Row Status ⑧⓪⓪⓪⓪

▪▪ Offline
↻ Row Status ⑦⓪⓪⓪⓪

↻ Query all parameters

Submit  Save & Exit

| Parameter Refresh Status | | | | |
|---|---|---|---|---|
| ⟲ | | Retrieving Parameter 2 out of 7 Cancel | | |
| | | | Expand all errors | |
| Status | Parameter | Data Source Query | Elapsed Time | Result |
| OK | Agitation | Historian Trend Filtered | 00:014 | No values updated |
| ⟲ Retrieving | Flow Rate | Historian Trend Filtered | | |
| Queueing | OUR | Historian Trend Filtered V1 | | |
| Queueing | Temp | Historian | | |

FIG. 14C

| | A | B | C | D | E |
|---|---|---|---|---|---|
| 1 | Status | Timestamp (ID) | Agitation | Flow Rate | OUR |
| 2 | Draft | 2015-06-18 17:38 | 255.7523131 | 6.760522322 | 7.879327 |
| 3 | Draft | 2015-06-18 20:38 | 209.2073759 | 7.872889214 | 7.41391 |
| 4 | Draft | 2015-06-18 23:38 | 161.2875143 | 8.836518674 | 6.601855 |
| 5 | Draft | 2015-06-19 02:38 | 180.1609815 | 7.773195562 | 5.896549 |
| 6 | Draft | 2015-06-19 05:38 | 220.461625 | 6.976229615 | 6.510901 |
| 7 | Draft | 2015-06-19 08:38 | 263.6515019 | 6.203492658 | 7.156515 |
| 8 | Draft | 2015-06-19 11:38 | 283.7547503 | 5.238022966 | 8.030183 |
| 9 | Draft | 2015-06-19 14:38 | 237.7664398 | 6.261688295 | 8.866283 |
| 10 | Draft | 2015-06-19 17:38 | 191.6258302 | 7.532464895 | 9.107977 |
| 11 | Draft | 2015-06-19 20:38 | 157.7568014 | 8.549177902 | 8.404101 |
| 12 | Draft | 2015-06-19 23:38 | 205.6489539 | 8.310335683 | 7.852245 |
| 13 | Draft | 2015-06-20 02:38 | 246.9497169 | 7.043223012 | 7.301429 |
| 14 | Draft | 2015-06-20 05:38 | 291.8902848 | 5.928832636 | 6.636429 |
| 15 | Draft | 2015-06-20 08:38 | 259.8365754 | 5.402269462 | 5.814934 |
| 16 | Draft | 2015-06-20 11:38 | 212.398975 | 6.488431786 | 6.442795 |
| 17 | Draft | 2015-06-20 14:38 | 158.7696148 | 7.651632142 | 7.217586 |
| 18 | Draft | 2015-06-20 17:38 | 198.5831472 | 8.645023933 | 7.988733 |
| 19 | Draft | 2015-06-20 20:38 | 250.1984884 | 8.446173438 | 8.761334 |

FIG. 14D

ASSISTED QUERY BUILDING AND DATA RETRIEVAL

CROSS REFERENCE TO RELATED APPLICATIONS

This application claims priority to U.S. Provisional Application No. 62/881,805, entitled "Assisted Query Building and Data Retrieval," filed on Aug. 1, 2019, and to U.S. Provisional Application No. 62/951,575, entitled "Assisted Query Building and Data Retrieval," filed on Dec. 20, 2019, and to U.S. Provisional Application No. 63/040,403, entitled "Assisted Query Building and Data Retrieval," filed on Jun. 17, 2020, each of which are hereby incorporated herein by reference in their entireties.

FIELD

The present disclosure relates generally to querying remote databases over a network.

BACKGROUND

Manufactured products, such as pharmaceutical products, food and beverage products, and other products generated through chemical and manufacturing processes, often must meet particular specifications, e.g., regulatory specifications, internal specifications, or the like. There may be specifications related to limits on certain components of the product (e.g., impurity percentages, chemical components, identity characteristics, etc.). Product specifications may depend on various factors, such as, for example, product type, target market, environmental impact, cost, and the like. During production or experimental runs, a company tests various chemical components and compositions for batches or runs of the product to assess whether the components fall within particular limits corresponding to a specification or parameter.

The applicable limits may be set by the company for various reasons including to limit cost, ensure purity, desired performance, etc., by a regulatory authority (e.g., to ensure safety and limit environmental impact), or by a third party interest (e.g., an investor). A batch is typically considered to be in compliance with the established goals and/or regulations when its parameter values are within the prescribed limits. Limits may change over time, such as due to changing regulatory schemes, product changes, or the like, and, as such, batches analyzed at different times may have different applicable limits. In order to ensure compliance, companies must monitor their products and processes at all stages of development, and collect, organize, and analyze data related to the imposed requirements. In some cases, products sponsored by one company may be produced in whole or in part at multiple sites either internally or with manufacturing partners. In these instances, the sponsor company is still responsible to ensure compliance of its products. The ability to access, collect, organize and analyze the manufacturing data across the manufacturing network is needed to ensure compliance.

In addition, regulatory bodies have imposed certain requirements on data management to ensure data integrity. Data integrity requires that data is complete, consistent, and accurate. In particular, with increasing use of computerized systems, there must be some controls in place to prevent unauthorized access or changes to data. For example, the current Good Manufacturing Practice (cGMP) for drugs released by the FDA requires a means to ensure data protection for any computerized system. For example, cGMP guidance recommends that there be a record of any data change made, the previous entry, who made the change, and when the change was made.

Conventional methods to monitor compliance in data collection require tedious, manual input and comparison of data or require programming skills. For example, companies often organize data in Excel spreadsheets, manually entering the data and applicable limits relevant at the time the data was collected. Such manual entry can be daunting as batches and their applicable limits can be numerous and the sources for such data can be many and widely dispersed. Because the data sources can be numerous widespread, it may be difficult for a process expert to locate and aggregate the copious amounts of data related to a batch. Further, data stored in Excel spreadsheets generally does not meet industry requirements for data integrity and tracking changes.

A process expert or lab technician may need to monitor multiple processes or batches collected over time. Conventional searching techniques for the collected data, even in complex databases, can be time consuming and require an information technology (IT) expert to create a query specific to the process or batch data collected. These searching techniques make it difficult for multiple users to efficiently and effectively run reports, and require new and specific queries to be generated for each data set within a database. Conventional searching techniques may be further complicated by the use of multiple batches of a raw material, where the raw material batches may have slightly different characteristics and should be tracked throughout the processes.

The information included in this Background section of the specification, including any references cited herein and any description or discussion thereof, is included for technical reference purposes only and is not to be regarded subject matter by which the scope of the invention as defined in the claims is to be bound.

SUMMARY

An example method for querying one or more databased includes receiving, at a processor, a request to execute, for a specified process, a generic query having a dynamic query parameter. One or more expected parameters are determined for the query based on the dynamic query parameter and the process, where the one or more expected parameters are tagged to the dynamic query parameter for the process. Based on the one or more expected parameters, one or more measured parameters are accessed from the one or more databases, where the one or more databases are accessible by the processor over a network. The one or more measured parameters are returned by the processor responsive to the request to execute the generic query.

An example method of querying one or more databases over a network includes receiving, at a processor, a request to execute, for a specified process, a generic query having a dynamic query parameter. A process parameter is determined for the query based on the dynamic query parameter and the process, where the process parameter is tagged to the dynamic query parameter for the process. A measured parameter corresponding to the process parameter is generated by executing one or more sub-queries associated with the measured parameter during the process, where the one or more sub-queries are executed using measured data from one or more databases accessible by the processor over the network. The measured parameter is returned by the processor responsive to the request to execute the generic query.

One or more example non-transitory computer readable media include instructions which, when executed by one or more processors of a computing device, cause the computing device to determine, responsive to a request to execute a generic query for a process, a first measured parameter for the process corresponding a first query parameter of the generic query and a second measured parameter for the process corresponding to a second query parameter of the generic query. The computing device further accesses a first value associated with the first measured parameter and executes a first query function associated with the first query parameter based on the first value associated with the first measured parameter. The computing device further accesses a second value associated with the second measured parameter and executes a query function associated with the second query parameter based on the second value associated with the second measured parameter. The computing device further displays a query result based on the execution of the first query function and the execution of the second query function.

An example method includes storing a lot characteristic associated with a first raw material lot including a raw material and defining a process for producing a product including the raw material. The first raw material lot is tracked during production of the product and a product characteristic is generated corresponding to the product by aggregating the lot characteristic of the first raw material lot based on the tracking of the first raw material lot.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 7B shows an exemplary window displayed on a graphical user interface for reviewing external data access and accessing data source and query information.

FIG. 7C shows an exemplary window displayed on a graphical user interface for reviewing data source information.

FIG. 7E shows the window of FIG. 7C with a pop-up window for editing data source information.

FIG. 7F shows the window of FIG. 7C with a selection option for testing a connection to a data source.

FIG. 8 shows an exemplary window displayed on a graphical user interface for reviewing and inputting query information.

FIG. 9 is a table showing various value sources for the query parameters.

FIG. 10A shows an exemplary window displayed on a graphical user interface for entering data entries as query parameters in the system.

FIG. 10C shows the window of FIG. 10A with a dynamic query parameter having an exemplary code for retrieving the parameter value from another location.

FIG. 10D shows the window of FIG. 10A with an exemplary code data entry for a dynamic query parameter that points to batch metadata for the parameter value.

FIG. 11A shows a pop-up window on an exemplary window displayed on a graphical user interface for creating and editing a batch.

FIG. 11B shows an exemplary window on a graphical user interface for querying different process parameters associated with the batch created with the pop-up window of FIG. 11A.

FIG. 11C shows an exemplary window on a graphical user interface for reviewing data source and query information for a process parameter associated with the batch created with the pop-up window of FIG. 11A.

FIG. 11D shows a status window displayed on the window of FIG. 11B for displaying batch query error results.

FIG. 12A shows an exemplary window displayed on a graphical user interface for selecting a parameter to test a query.

FIG. 12C shows a pop-up window displayed on the window of FIG. 12A showing information related to the query tested with the parameter.

FIG. 12D shows the pop-up window of FIG. 12C showing the query test results.

FIG. 13B shows the window of FIG. 13A with query icons for querying selected parameters based on parameter category.

FIG. 13D shows an exemplary replicate table displayed on a graphical user interface that provides query results for the multiple queried parameters.

FIG. 14B shows the window of FIG. 14A with query icons for querying selected parameters based on parameter category.

FIG. 14C shows the window of FIG. 13C for monitoring query execution of the parameters selected using the window of FIG. 14A.

FIG. 14D shows an exemplary continuous table displayed on a graphical user interface that provides query results for the multiple queried parameters.

DETAILED DESCRIPTION

Figure 1:
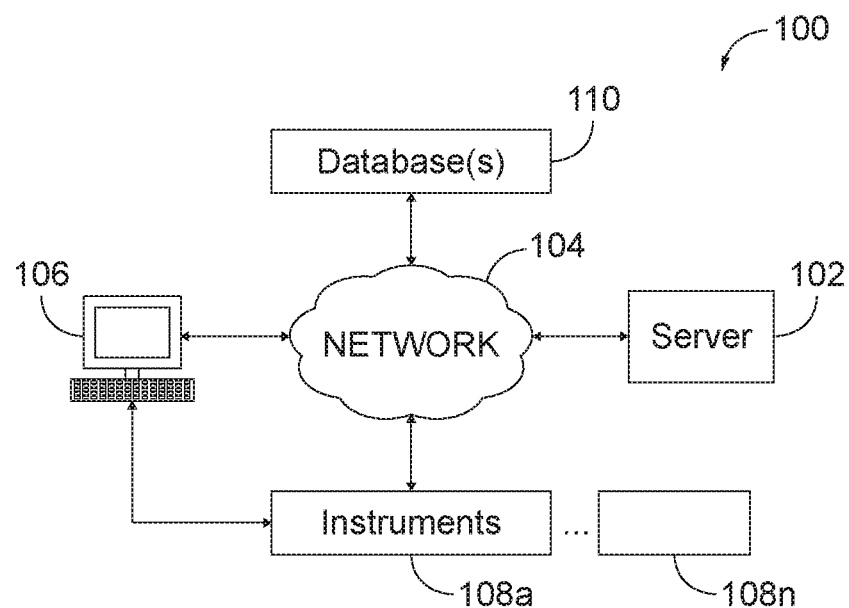
FIG. 1 illustrates a system diagram of an assisted data query building and retrieval system.

The present disclosure relates generally to a system to query one or more databases using generic queries that can be executed on specific data sets and return data specific results, without requiring a rewrite of the query for each specific data set. A generic data query may be created by a programmer or technical expert and stored by the system. The generic data query may include one or more query parameters that may act as placeholders to allow insertion of the specific data be utilized for the query. The query parameters may be static (e.g., the same across multiple applications or processes) or dynamic (e.g., varying across multiple databases, applications or processes). For example, a dynamic query parameter may include a category of parameters, such that any parameter within the category of parameters can be input into the generic query. In this manner, different parameters (e.g., sucrose and glucose) falling into the same general category (e.g., materials) can apply the same generic query. As such, the same generic query may be used for multiple different databases, applications, or processes, limiting the number of specific queries that need to be generated and the time to query data related to a specific process. By providing a generic query that can retrieve specific data, a user can easily locate data of interest without any programming knowledge.

In several embodiments, data input into the system is tagged (e.g., associated) with one or more query parameters. For example, data input into the system may be entered as part of one or more expected parameters associated with a data collection process, such as process parameters associated with a manufacturing process and/or batch of product produced via a process. For example, a user (e.g., a process expert, lab technician, or the like) may generate various parameters that will be measured or otherwise determined during a process run for a product being tested or manufactured, e.g., as a new process is set up for a plant, a process expert may select certain parameters or categories of data that will be monitored and stored during manufacturing and tag these as belonging to a particular category or generic query parameter.

As one example, during pharmaceutical drug production, process parameters may include materials used, drug components and concentrations, impurities, pH, manufacturing conditions (e.g., temperature, timing, equipment, etc.), and the like, all of which may be measured or input as metadata tied to batches of products that are created via the process. When a process is initially set up for data collection within a data collection system or database, the process expert can input select process parameters into the system as being correlated to or tagged as a query parameter. For example, temperature may be tagged as a temperature query parameter, the materials used may each be tagged as a materials query parameter, the drug components may each be tagged as a components query parameter, and the like. The process parameters and associated tags may be stored by the system. By indicating select process parameters are correlated to selected query parameters, as data is collected for a process, such as during batches run via the process, the data collected for each parameter will be tagged with the corresponding query parameter.

In several embodiments, a user may run a specific query on a data set using a generic query based on tagging of the data set to one or more query parameters in the generic query. For example, a user may select a batch query to execute with a specific process, a generic query for average value of all materials can be executed on a batch, without specifying the materials or average function. Then, when the query is executed, it looks to the batch metadata to determine the data values satisfying the materials placeholder parameter in the query, which in one example may be glucose, and then will average all of the sampled data points for glucose via the averaging equation or function. Because the query functionality is generic, the user can execute the query across multiple different batches of data collected from different processes, but receive returned values specific to each batch, without having to tailor the query to the specific dataset, relying instead on the generic placeholders to point to the specific data to be used for the results.

In several embodiments, when a query is executed, one or more previously tagged measured parameters and their associated data values are located. For example, the query locates measured data parameters having an associated tag that matches the tag associated with the process parameter. In the example discussed previously, when the process parameter glucose, tagged with the query parameter materials, is queried, a measured data parameter glucose, also tagged with the query parameter materials, and its associated data value(s) are located and returned. Additionally, different types of data, such as third party databases, other query parameters and placeholders, may be tagged as a query parameter. Then, during execution of the query, the system may continuously link across multiple platforms, databases, or the like, to determine the relevant data pointed by the query parameter.

In some implementations, several batches of raw materials may be used during production, each having slightly different raw material characteristics. Accordingly, during execution of the query, the system may reference raw material characteristics from several batches in accordance with proportions of different batches of the raw materials used in a process. Where a query includes a material process parameter, the material process parameter may be determined by recursive reference to raw material characteristics for various batches of raw materials included in the material or used to produce the material.

Turning now to the figures, a system of the present disclosure will be discussed in more detail. FIG. 1 is a block diagram illustrating an example of an assisted data query building and retrieval system 100. The system 100 includes a user device 106, which may be in communication with one or more instruments 108a-n. The system may also include a server 102 and one or more databases 110, which may be in communication with the user device 106 and/or instruments 108a-n. Each of the various components of the assisted data query building and retrieval system 100 may be in communication directly or indirectly with one another, such as through a network 104. In this manner, each of the components can transmit and receive data from other components in the system. In many instances, the server 102 may act as a go between for some of the components in the system 100.

The network 104 may be substantially any type or combination of types of communication system for transmitting data either through wired or wireless mechanism (e.g., WiFi, Ethernet, Bluetooth, cellular data, or the like). In some embodiments, certain components in the assisted data query building and retrieval system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 104 and communication mechanisms for each of the components may be varied as desired.

The server 102 includes one or more computing devices that process and execute information. The server 102 may include its own processing elements, memory components, and the like, and/or may be in communication with one or more external components (e.g., separate memory storage) (an example of computing elements that may be included in the server 102 is disclosed below with respect to FIG. 2). The server 102 may also include one or more server computers that are interconnected together via the network 104 or separate communication protocol. The server 102 may host and execute a number of the processes executed by the system 100.

The user device 106 may be any of various types of computing devices, e.g., smart phones, tablet computers, desktop computers, laptop computers, set top boxes, gaming devices, wearable devices, or the like. The user device 106 provides output to and receives input from a user. For example, the user device 106 may receive parameter or data inputs and values and query requests from a user and output query results to a user. The type and number of user devices 106 may vary as desired.

The instruments 108a-n may be any type of instrument or technology used to create, sample, and test a product. For example, the instruments 108a-n may be any instrument used to perform an assay (e.g., a cell counter, mass spectrometer, NIR probe, or the like). As another example, the instruments 108a-n may include a sensor that can monitor one or more parameters (e.g., temperature, pressure, pH, electricity, motion, or the like).

The database or databases 110 may be an internal database used by the system or an external databased linked to the system by a user. For example, an external database may be associated with a third party. For example, the database may be associated with the U.S. Food and Drug Administration, the European Medicines Agency, Veterinary Medicines Directorate, the World Health Organization, the Health Products Regulatory Authority, or similar regulatory bodies. As another example, an external database may be associated with a person or company associated with batch production (e.g., a test lab, a producer, a quality control company, etc.). The databases 110 may store compliance information (e.g., specification limits for certain chemical components or chemical compositions, processes, or the like), batch information (e.g., measured data parameters and their associated data values, e.g., equipment used, chemical purity levels, pH levels, etc.), and the like.

Figure 2:
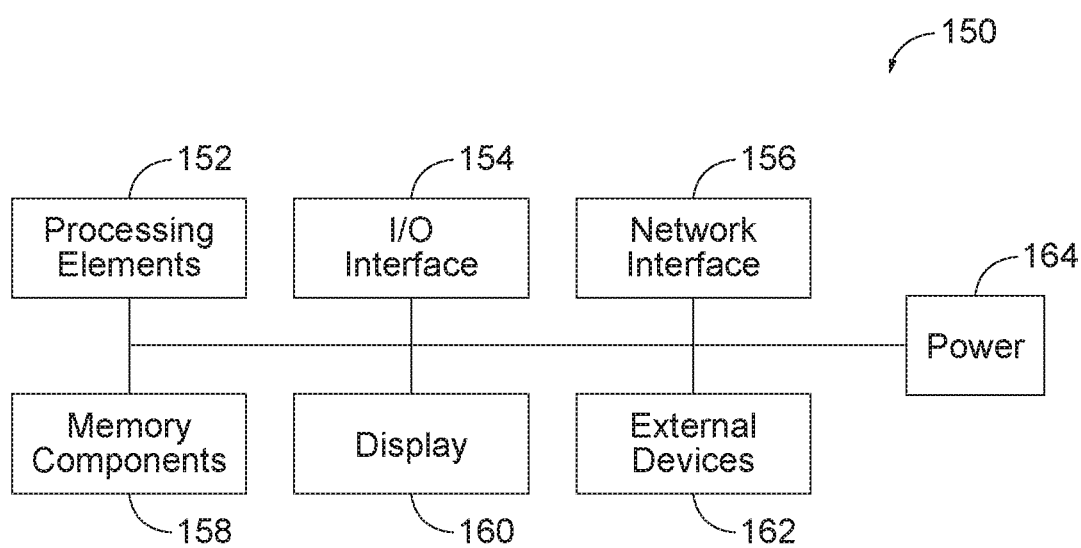
FIG. 2 illustrates a simplified block diagram of various computing devices of the system of FIG. 1.

A simplified block structure for a computing device that may be used with the system 100 or integrated into one or more of the system 100 components is shown in FIG. 2. For example, the server 102, user device 106, instruments 108a-108n, and/or database(s) 110 may include one or more of the components shown in FIG. 2 and use one or more of these components to execute one or more of the operations disclosed in methods 180, 200, 250, and 300. With reference to FIG. 2, the computing device 150 may include one or more processing elements 152, an input/output (I/O) interface 154, a network interface 156, one or more memory components 158, a display 160, one or more external devices 162, and a power source 164. Each of the various components may be in communication with one another through one or more busses, wireless means, or the like.

The processing element 152 is any type of electronic device capable of processing, receiving, and/or transmitting instructions. For example, the processing element 152 may be a central processing unit, microprocessor, processor, or microcontroller. Additionally, it should be noted that select components of the computer 150 may be controlled by a first processor and other components may be controlled by a second processor, where the first and second processors may or may not be in communication with each other.

The memory components 158 are used by the computer 150 to store instructions for the processing element 152, as well as store data, such as batch data (e.g., measured data parameters), process parameters, time information, limit values, and the like. The memory components 158 may be, for example, magneto-optical storage, read-only memory, random access memory, erasable programmable memory, flash memory, or a combination of one or more types of memory components.

The display 160 provides visual feedback to a user and, optionally, can act as an input element to enable a user to control, manipulate, and calibrate various components of the computing device 150. The display 160 may be a liquid crystal display, plasma display, organic light-emitting diode display, and/or cathode ray tube display. In embodiments where the display 160 is used as an input, the display 160 may include one or more touch or input sensors, such as capacitive touch sensors, resistive grid, or the like.

The I/O interface 154 allows a user to enter data into the computer 150, as well as provides an input/output for the computer 150 to communicate with other devices (e.g., server 102, instruments 108a-n, other computers, speakers, etc.). The I/O interface 154 can include one or more input buttons, touch pads, and so on.

The network interface 156 provides communication to and from the computer 150 to other devices. For example, the network interface 156 allows the server 102 to communicate with the instruments 108a-n through the network 104. The network interface 156 includes one or more communication protocols, such as, but not limited to WiFi, Ethernet, Bluetooth, and so on. The network interface 156 may also include one or more hardwired components, such as a Universal Serial Bus (USB) cable, or the like. The configuration of the network interface 156 depends on the types of communication desired and may be modified to communicate via WiFi, Bluetooth, and so on.

The external devices 162 are one or more devices that can be used to provide various inputs to the computing device 150, e.g., mouse, microphone, keyboard, trackpad, or the like. The external devices 162 may be local or remote and may vary as desired. The power source 164 may be any source of power that enables the computer 150 to function (e.g., wall power, a battery, or the like).

Figure 3:
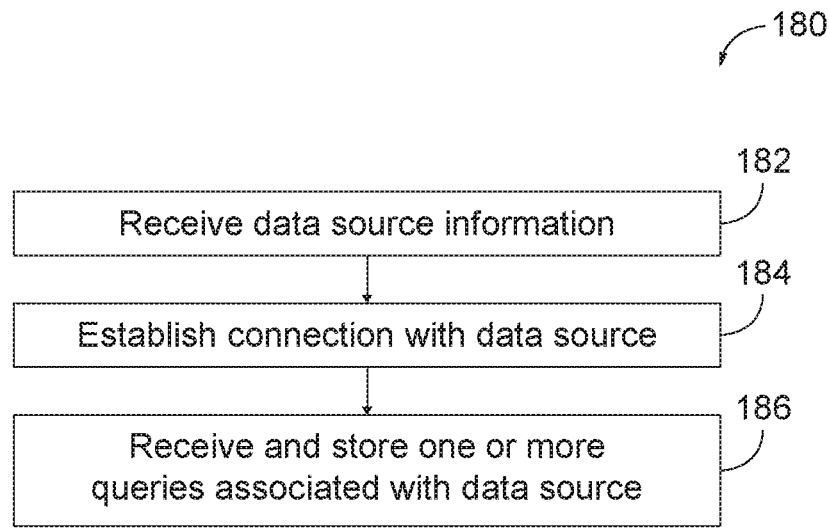
FIG. 3 is a flow chart illustrating a method for establishing generic queries associated with one or more data sources.
Figure 7A:
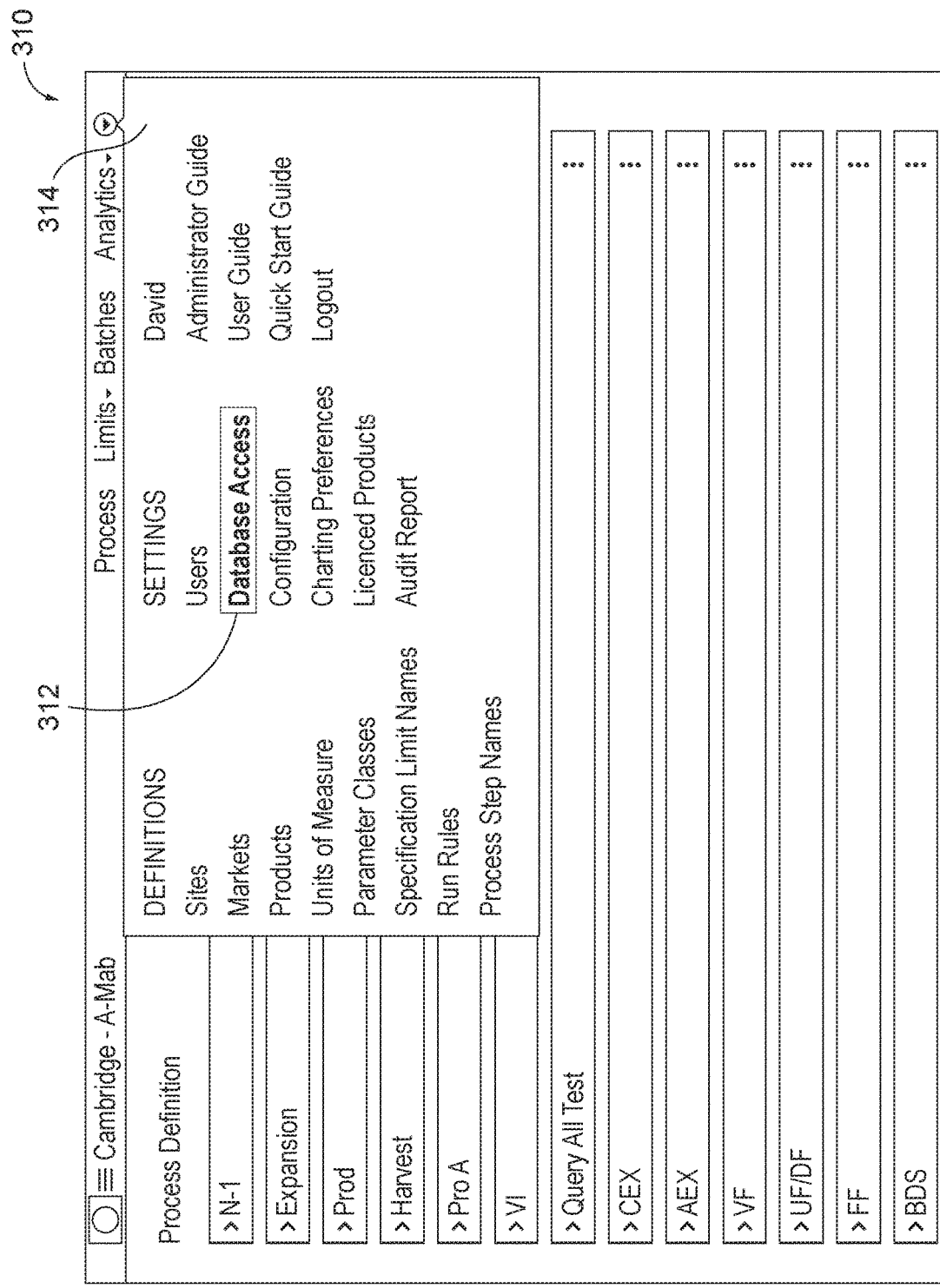
FIG. 7A shows an exemplary window displayed on a graphical user interface for accessing data source information.
Figure 7D:
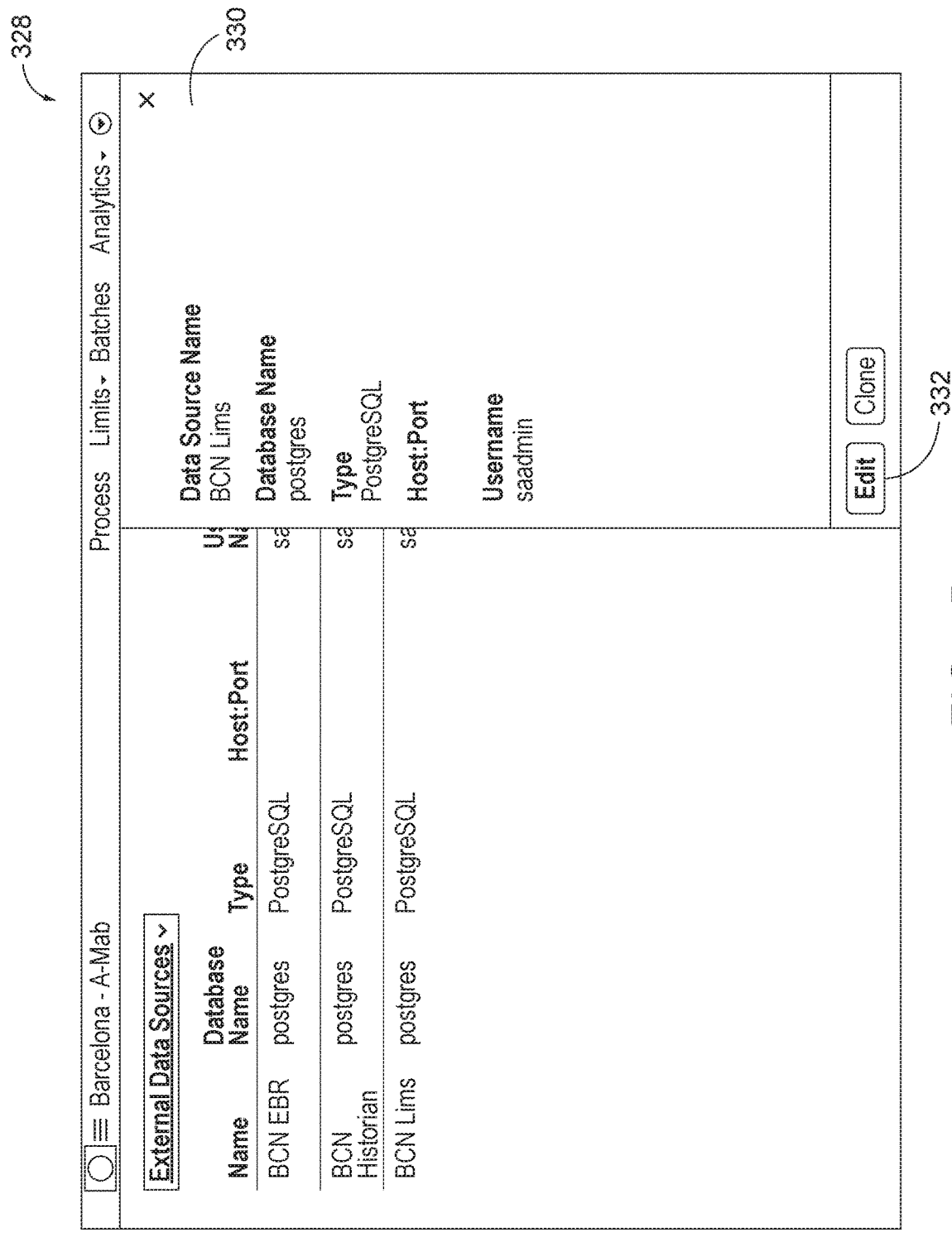
FIG. 7D shows the window of FIG. 7C with a pop-up window for reviewing details related to a selected data source.
Figure 7E:
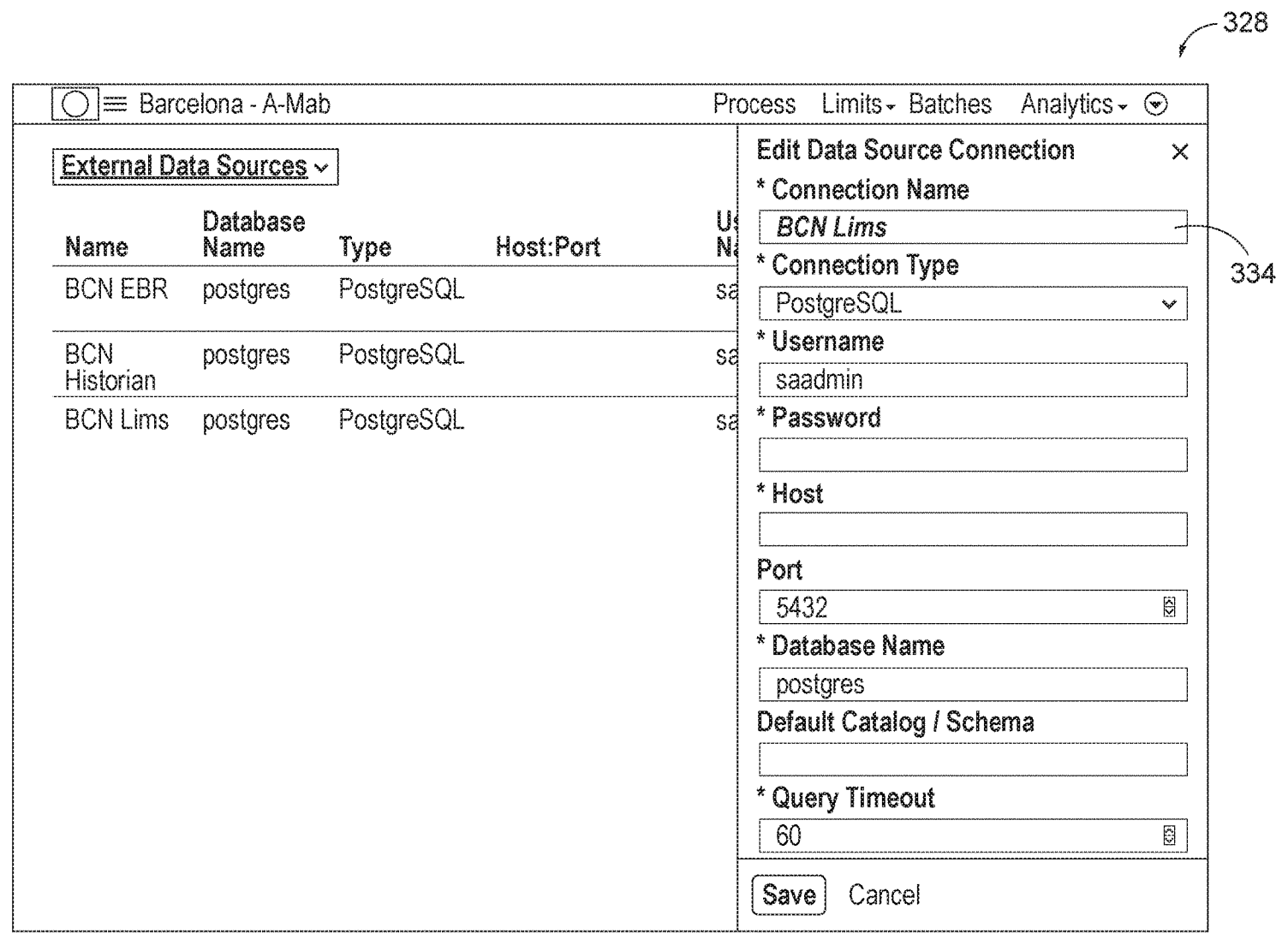

FIG. 3 is a flow chart illustrating a method for establishing generic queries associated with one or more data sources. The method 180 begins with operation 182 and data source information is received. Data source information may be input by a user, such as, for example, by a technical or process expert. For example, FIGS. 7A-F show exemplary windows displayed on a graphical user interface for inputting data source information. As shown in FIG. 7A, a user may access one or more databases through the system via a database access selection 312 in a drop down menu 314 on a window 310 of the graphical user interface. After selecting the database access selection 312, a new window 316 is displayed on the graphical user interface providing a database access dropdown menu 318 with selections for external data access 320, external data sources 322, and data source queries 324, as shown in FIG. 7B. After selecting external data sources 322 from the dropdown menu 318, a new window 328 is displayed on the graphical user interface that allows a user to review and edit information related to the external data sources, as shown in FIGS. 7C-F. Various types of data sources may be stored in one or more databases. In the example shown, three different data sources, BCN EBR, BCN Historian, and BCN Lims are stored in the same database titled postgres. Other data source information may be stored by the system, such as, for example, the type of database, host port, user name (e.g., of the user that added the data source), test query results (e.g., whether a connection was established, test date, etc.), and the like. As shown in FIG. 7D, a user may select a data source to review related information in a pop-up window 330. The pop-up window 330 may include an edit selection 332 for a user to edit the information associated with the selected data source. For example, as shown in FIG. 7E, a user may edit various fields 334 to update information associated with a data source.

Figure 7F:
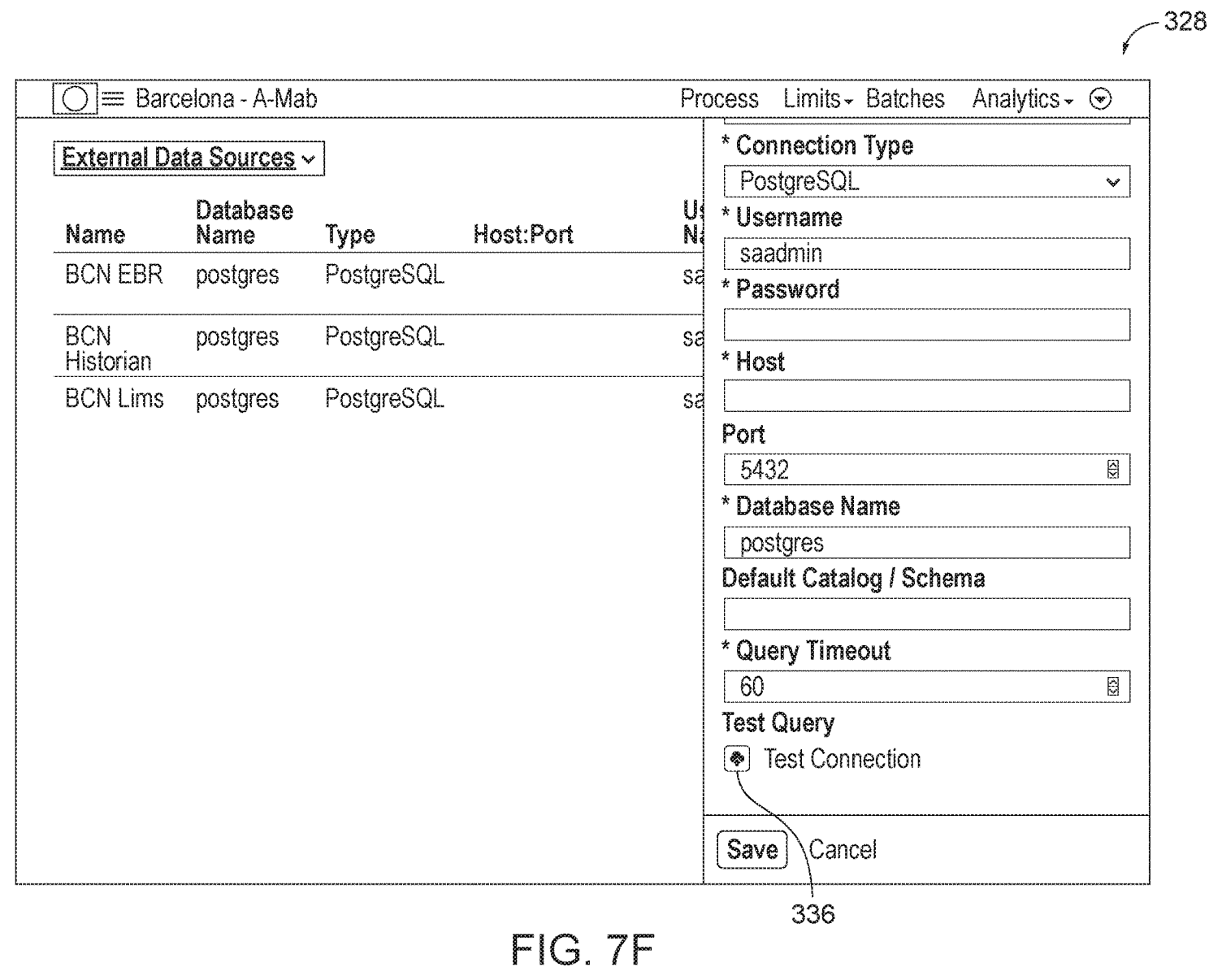

After operation 184, the method 180 proceeds to operation 184 and a connection is established with the data source. For example, a connection is established for the system to query the data source to retrieve data associated with a query. As shown in FIG. 7F, a user may test a connection to a data source by selecting a test connection button 336. As shown in FIG. 7C, the results of this connection test are displayed as information associated with the external data source (e.g., an OK 338 indicating a successful connection with the data source).

After operation 184, the method 180 proceeds to operation 186 and one or more queries associated with the data source are received and stored by the system. One or more queries may be input by a user, such as, for example, a technical or process expert. For example, FIG. 8 shows an exemplary window 340 displayed on a graphical user interface for reviewing and inputting query information. As shown, a query may have a query name, an associated data source (e.g., a location to pull the data queried), a description of the type of information queried, one or more query parameters, and test information (e.g., whether the query is functional or returns one or more errors). One or more of the queries are generic queries. A generic query may have one or more query parameters. The query parameters are data to be retrieved by the query. A query parameter may be static, and remain constant with different query executions (e.g., constant across different processes), or a query parameter may be dynamic, and change with different query executions (e.g., may differ for different processes or batches). For example, as shown in the exemplary query titled BCN EBR Materials Data 342, the query 344 includes a static parameter batch_no. 346, which remains constant with different query executions, and a dynamic parameter [@MATERIAL_NAME] 348, which varies with different query executions. However, it is also contemplated that a query may have multiple dynamic parameters, e.g., as shown for the query 350 titled BCN Historian Summary 352. In these examples, the dynamic parameters are indicated in brackets; however, it is contemplated that other symbols, numbers, or letters may be used to indicate a dynamic parameter.

A query parameter may be pulled from one or more sources. For example, FIG. 9 is a table showing various value sources for the query parameters. For example, a query parameter may be a literal value 354, a data entry 356, queried from another data source 358, a derived value 360, or batch metadata 362. A literal value 354 may be a pre-configured or fixed value in the query (e.g., a static query parameter). The value may be a qualitative or quantitative value. As one example, a quantitative value is indicative of an attribute of the data. For example, a query parameter test status may have a quantitative value of APPROVED, as shown, or DENIED, or a test name may have a value of pH, temperature, or the like. A literal value 354 may be the same from batch to batch.

A data entry 356 may be a query parameter value input by a user. In contrast to a literal value 354, a data entry 356 may be varied from batch to batch. A data entry 356 input by a user may be an actual value or a code to retrieve the value from another data source. In the example shown, a data entry 356 may be, for example, "Parameter.Status." In this example, the quotes may represent metadata; however, it is contemplated that other symbols, numbers or letters may be used to indicate metadata. In the example shown, the parameter values without an @ symbol may represent a unique process parameter reference; however other symbols, numbers or letters may be used to indicate a unique process parameter reference.

Figure 10B:
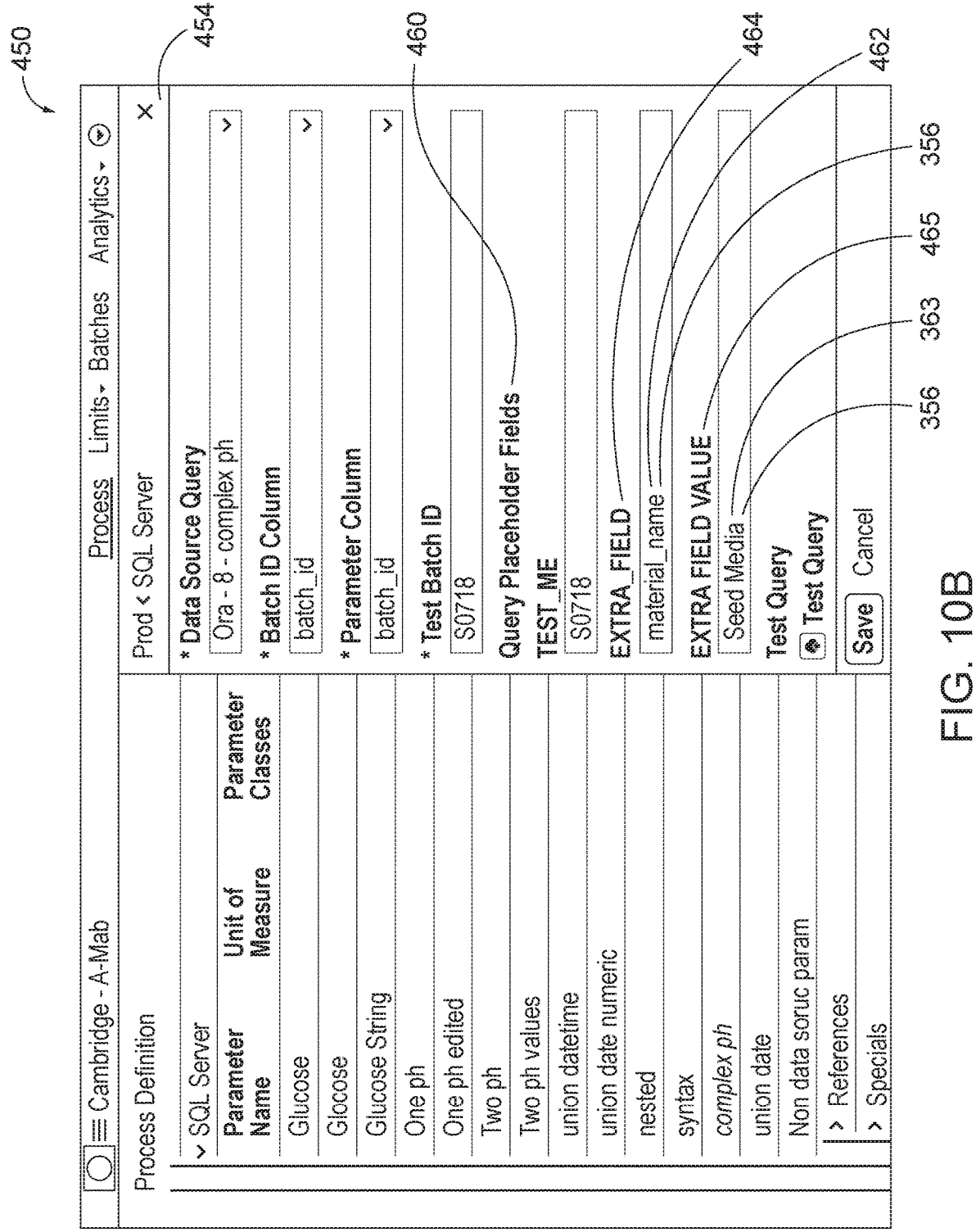
FIG. 10B shows the window of FIG. 10A with editable dynamic query parameters.

FIGS. 10A-D show an exemplary window displayed on a graphical user interface for entering data entries as query parameters in the system. For example, as shown in FIG. 10A, when a user selects a parameter 452 in the window 450, a text box or graphic 454 appears including information related to the parameter 452, such as batch and query data. In the example shown, the parameter complex ph 456 has been selected. As shown, the text box 454 indicates the parameter name, description, parameter source, data source query, batch ID column, parameter column, test batch ID, query status, query placeholder fields (e.g., TEST-ME, EXTRA_FIELD, EXTRA_FIELD_VALUE), unit of measure, data type, status, parameter classes, query alias, reference URLs, attachments, and notes associated with the parameter. A user may select the edit button 458, shown at the bottom of the text box 454, to edit the information. For example, as shown in FIG. 10B, a user may edit the Query Placeholder Fields 460 (e.g., dynamic query parameters or parameter categories). As one example, the user has entered material_name 462 as a data entry 356 for the query parameter EXTRA_FIELD 464 and Seed Media 463 as a data entry 356 for the query parameter EXTRA_FIELD_VALUE 465.

As another example, FIG. 10C shows a data entry 356 for a query parameter field having a code (in this example, a string of words and periods) to retrieve the query parameter value from another location. As shown, the data entry 356 for Query Placeholder Field 460 RM_LOT_ID 466 is Prod.Oracle.References.Seed Salt Lot No 468. In this example, the value for RM_LOT_ID 466 is queried from the Seed Salt Lot No parameter 470 and the RM_LOT_ID value for the Seed Salt Lot No parameter 470 is used in the query for the parameter Seed Salt Sample DT 472. As yet another example, FIG. 10D shows a data entry 356 for a query parameter field (e.g., Query Placeholder Field 460) EQUIP_ID 474 having a code to retrieve the query parameter value from another location @Equipment ID 476. In this example, the code includes an @ symbol. In several embodiments, an @ symbol directs the system to query the batch metadata for the applicable value. While an @ symbol is used in the present example, it is contemplated that any symbol or arrangement of symbols or text may be used to instruct the system to query the batch metadata.

Returning to FIG. 9, as another example, a query parameter may be queried from another data source 358 without user input. For example, a query parameter may include a symbol, word arrangement, code, or the like, instructing the system to retrieve the value from another data source or location. For example, the other data source may be another database, a previously queried parameter, or the like. In the example shown, the query parameter value Parameter.Lot Number indicates the value should be queried from the value previously determined for the parameter Lot Number.

As yet another example, a query parameter may be a derived value 360. A derived value 360 may be a sub-query executed by the system to calculate the derived value 360. In other words, a derived value 360 is determined by the system performing one or more data calculations. The derived value 360 may be data input by a user and manipulated in some manner by the system. For example, a derived value 360 may be a sum, an average, a percentage, a ratio, or any other calculated value. A derived value 360 may also be calculated based on characteristics of batches of raw materials used in production of a batch, as described with respect to FIGS. 15-17.

As another example, a query parameter may be batch metadata 362 without user input. For example, as discussed, an @ symbol may indicate metadata. In the example depicted, the batch metadata 362 value is @Market. In this example, the query parameter value will be pulled from the batch metadata value for market. As discussed previously, while an @ symbol is used in this example to indicate batch metadata, other symbols, numbers or text may be used to represent batch metadata.

Figure 4:
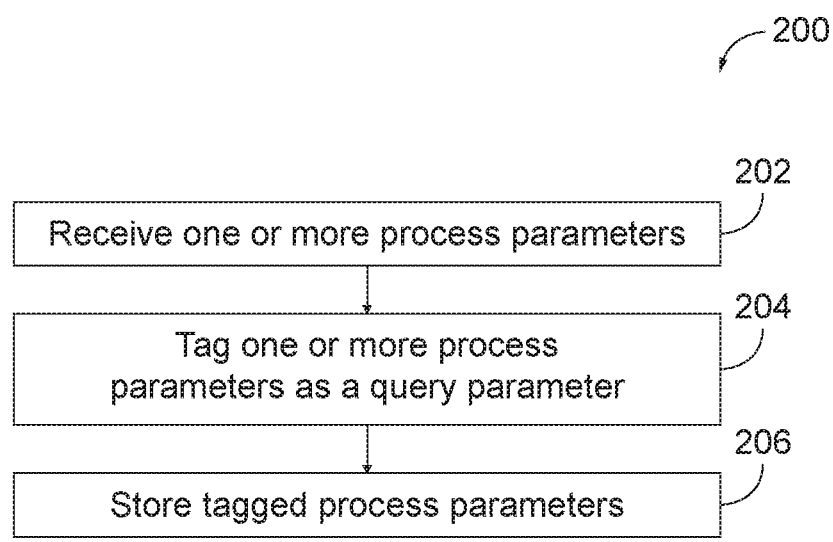
FIG. 4 is a flow chart illustrating a method for tagging process parameters.

FIG. 4 is a flow chart illustrating a method for associating process parameters with generic query parameters or placeholders. The method 200 begins with operation 202 and one or more process parameters are received, such as from entry via a user (e.g., a process expert) or retrieved from a database storing the one or more process parameters. Process parameters are those categories of data tracked for a particular process, such as a manufacturing or testing process, which may include measured or sensed value, input values, or the like, e.g., types of materials or ingredients, performance metrics, chemical characteristics, or the like. For example, a process expert may monitor particular parameters to ensure compliance with certain limits/regulations, to determine whether certain outcomes are achieved, or the like. As one example, for a drug manufacturing process, there may be limits/regulations on the concentration of one or more components, pH, impurities concentration, and the like. In this example, a process expert may input component concentration, pH, and impurities concentration as process parameters for the specific process of drug manufacturing.

After operation 202, the method 200 proceeds to operation 204 and one or more process parameters are associated with or tagged with a query parameter. A process parameter may be associated with a static query parameter or a dynamic query parameter. As one example, a process parameter temperature may be constant across different processes (e.g., each process may take into account temperature). The process parameter temperature may be associated with the static query parameter temperature, in that the category of the query may remain constant, although the data values associated with any particular dataset will change. As another example, the materials used for each process may vary across different processes. For example, a material may be glucose in one process and sucrose in another process. In this example, both glucose and sucrose may be process parameters associated with the dynamic query parameter materials. In this example, the dynamic query parameter is a category encompassing both parameters, as both are a type of material. In this example, both process parameters (e.g., for two different processes) are tagged as the same query parameter; however, it is contemplated that any number of process parameters may be tagged as the same query parameter.

In some embodiments, the association between process parameters and query parameters may be determined by a user. For example, a process expert may determine a predefined query parameter that relates to a process parameter. As one example, a specific compound or drug may be associated with a materials category or a components category, depending on whether the compound or drug is used as a raw material or measured as a resulting component of the finished product. For example, a process expert may determine glucose for Process A is associated with a materials query parameter, while glucose for Process B is associated with a components query parameter. In some embodiments, a process parameter may have more than one associated query parameter. For example, a process parameter bioreactor may have associated query parameters, such as equipment ID, equipment location, equipment start time, equipment end time, and the like.

In some embodiments, the association between process parameters and query parameters may be determined by the system. For example, the system may use previous associations input by a user to associate similar process parameters and query parameters. As one example, the system may assist the user by pre-tagging a process parameter when the test data is defined. As another example, the system may detect similarities between labels for process parameters and query parameters and determine a match. For example the system may determine a "temperature" process parameter matches a "temperature" query parameter and associate the two parameters.

After operation 204, the method 200 proceeds to operation 206 and the tagged association for the process parameters is stored. For example, the system may store the association between the process parameter and the query parameter, e.g., the query parameter may be stored as metadata corresponding to the process parameter to help ensure that data values collected for the process parameter are also associated with the tagged query parameter. In the above examples, the system stores the process parameter temperature tagged as the query parameter temperature (e.g., temperature=temperature); the process parameter sucrose as the query parameter materials (e.g., materials=sucrose); and the process parameter glucose as the query parameter materials (e.g., materials=glucose). This association between the process parameter and query parameter will determine which process parameters are used when a query including the corresponding query parameters is executed. Further, in some embodiments, the association between process parameters and query parameters may be stored for future use with similar processes.

Figure 5:
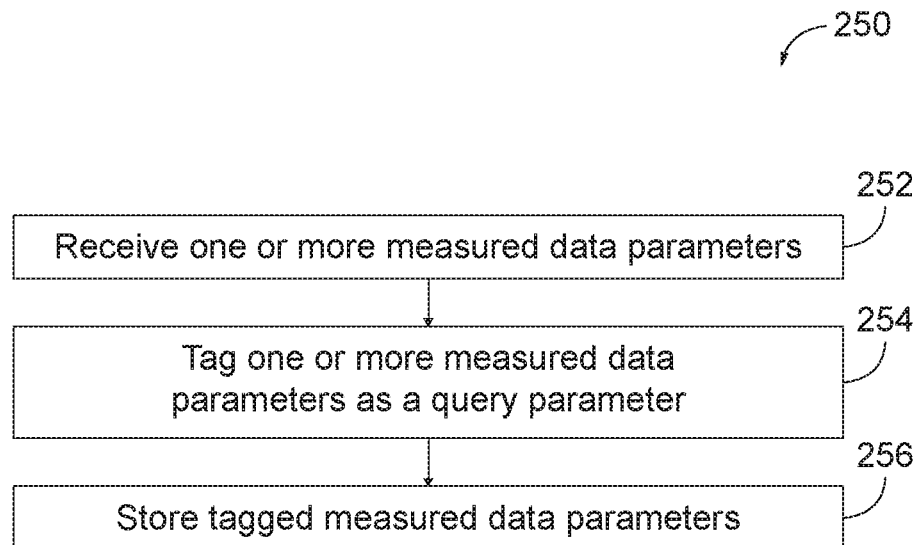
FIG. 5 is a flow chart illustrating a method for tagging measured data parameters.

FIG. 5 is a flow chart illustrating a method for associating received data values for process parameters with a particular query parameter or placeholder. The method 250 begins with operation 252 and received data values for a process parameter are received, such as via a direct input, input from sensors or other databases, or any number ways, that may occur during a process or experimental run of a product through a process. For example, as a drug is manufactured, one or more data parameters may be measured to assess drug quality and quantity, as well as compliance with any limits or regulations. The measured data parameters and their associated values are recorded, e.g., one or more instruments or sensors may collect the data and the collected data may be input into the system. As another example, a user, such as a lab technician or process expert, may measure the data and manually input the data into the system as it is collected.

After operation 252, the method 250 proceeds to operation 254 and the one or more measured data parameters are tagged with a query parameter. For example, the data values are tied to a particular process parameter, which as shown in FIG. 4, is associated with a query parameter. This association then flows to the specific data values. For example, as discussed above, a process parameter for Process A may be glucose. During execution of Process A, glucose may be a measured data parameter. In this example, the measured data parameter glucose is associated with the process parameter glucose. According to method 200, the process parameter glucose may have been previously tagged as a materials query parameter. Based on the determined associations, the measured data parameter glucose may also be tagged as a materials query parameter.

After method 254, the method 250 proceeds to operation 256 and the tagged measured data parameters are stored in a database. For example, the system may store the association between the measured data parameter and the query parameter. In the above example, the system stores the measured data parameter glucose (and its associated data values) with the query parameter materials tag (e.g., materials=glucose). This association between the measured data parameter and query parameter will determine which measured data may be pulled when a query including the corresponding query parameter is executed.

Figure 6:
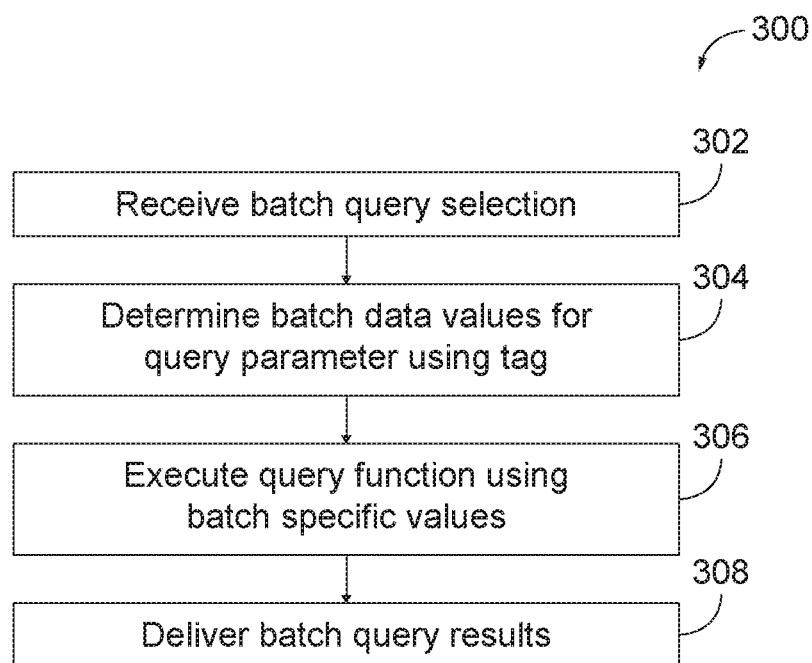
FIG. 6 is a flow chart illustrating a method of executing a generic query based on tagged parameters.
Figure 11A:
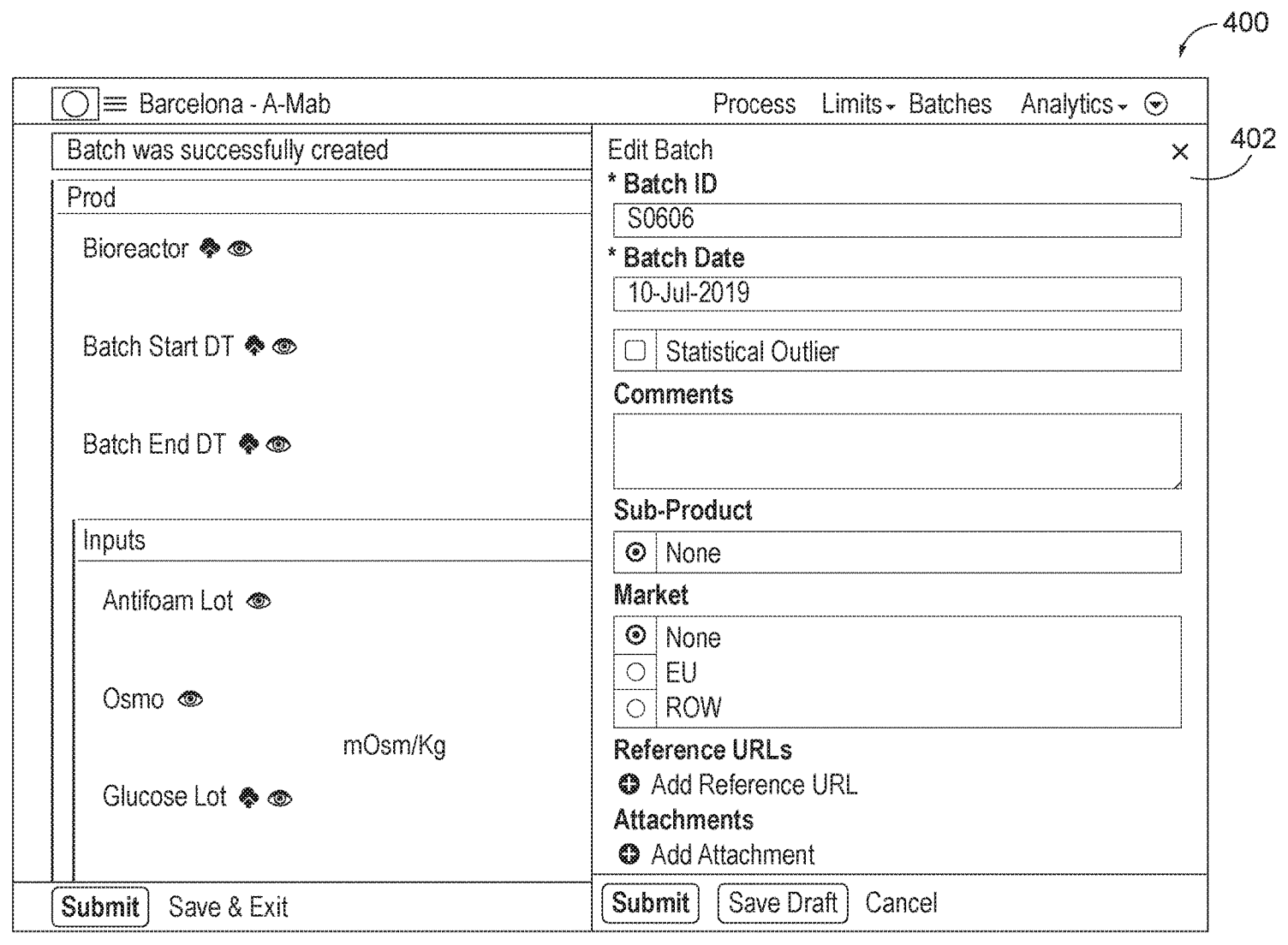
Figure 11B:
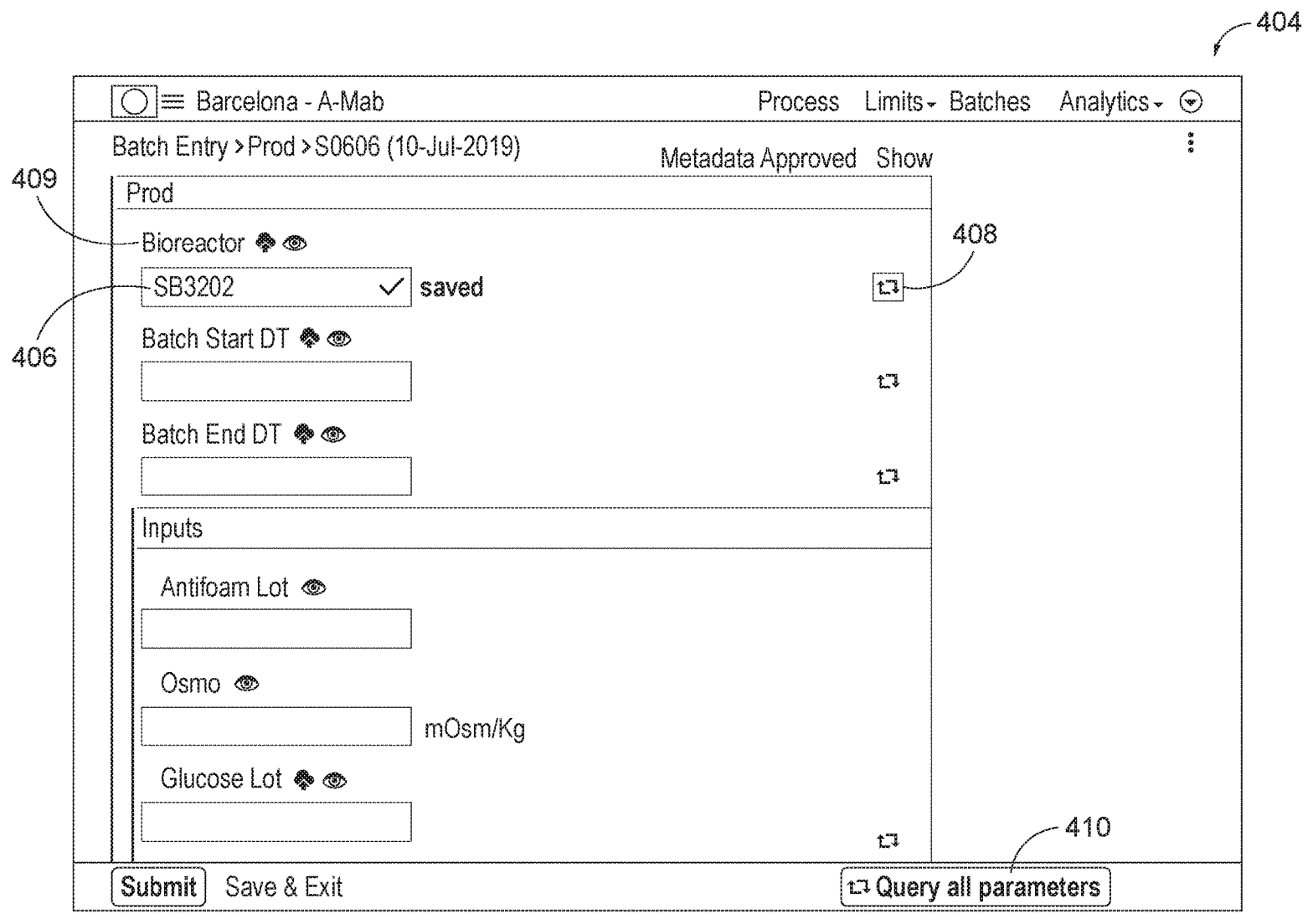

FIG. 6 is a flow chart illustrating a method of executing a generic query based on tagged parameters. The method 300 begins with operation 302 and a batch query selection is received. For example, FIGS. 11A-C show exemplary windows on a graphical user interface for creating a batch that can be queried. For example, FIG. 11A shows a pop-up window 402 appearing on a window 400 for creating and editing a batch. Batch information (e.g., batch ID, date, sub-product, market, reference URLs, attachments, etc.) can be entered by a user and saved. FIG. 11B shows a window 402 having fields 406 and icons 408 for querying different process parameters associated with the batch. Each parameter may be queried individually using the associated icon 408. For example, as shown, the process parameter bioreactor 409 is queried using the associated icon 408. Alternatively, some or all of the parameters may be queried together, for example, by selecting the "Query all parameters" button 410, as shown in FIG. 11B, or by selecting two or more parameters within a particular category and querying the category of parameters, as shown in FIGS. 13A-B and 14A-B, for example, and discussed in more detail below.

After operation 302, the method 300 proceeds to operation 304 and specific batch data values for a query parameter are determined using an associated tag. Query parameter values may be pulled from one or more sources. For example, as discussed above with respect to FIG. 9, a query parameter value may be a literal value 354, a data entry 356, queried from another data source 358, a derived value 360, or batch metadata 362. As discussed above with respect to FIGS. 10A-D, a data entry 356 may be a parameter value input by a user, such as a literal value or a code to retrieve the parameter value from another data source or location.

The system analyzes measured parameters and their associated values from the respective source to determine batch data values for query parameters based on associated tags. As discussed above with regards to method 200 of FIG. 4, a process parameter may be tagged with an associated query parameter. The system may analyze the previously tagged measured data parameters, as discussed with respect to method 250 of FIG. 5, for the measured data parameter associated with the same query parameter as that associated with the process parameter. In the example discussed above with respect to FIG. 11B, the queried process parameter bioreactor 409 may have been previously tagged with query parameter equipment ID. As shown in FIG. 11C, the measured bioreactor parameter 480 for batch S0606 may also be tagged with query parameter equipment ID 482. To determine the batch value for the queried process parameter bioreactor 409, the system determines the value for the measured bioreactor parameter having the same equipment ID tag, in this case the value for equipment ID 482 for batch S0606. In this example, the measured bioreactor parameter associated with equipment ID has a value of SB3202 (e.g., the serial number for the bioreactor), which is returned in the query, as shown in FIG. 11B.

As another example, a process parameter may be glucose, which may be tagged as a materials query parameter (e.g., MATERIALS=glucose), as discussed with respect to method 200 of FIG. 4. In this example, the measured data parameter glucose may also be tagged as a materials query parameter (e.g., MATERIALS=glucose), as discussed with respect to method 250 of FIG. 5. When executing the query, glucose may be input into a generic query as the value for the query parameter MATERIALS.

After operation 304, the method 300 proceeds to operation 306 and the query function is executed using the batch specific values. For example, as shown in FIG. 8, the query function may select various data to organize for display (e.g., by grouping data), perform a calculation (e.g., average, sum, etc.), or the like.

In one example, when the process parameter glucose is queried, glucose may be input into a generic query as the value for the query parameter MATERIALS, as discussed above. Using the value of glucose for MATERIALS, the system may analyze the measured query parameters for measured query parameters tagged as MATERIALS and labeled as glucose. If the query function selects and groups data for display, the query function may return the data values associated with the measured query parameter glucose and tagged as a MATERIALS query parameter.

After operation 306, the method 300 proceeds to operation 308 and the batch query results are delivered. For example, as shown in FIG. 11B, after the process parameter bioreactor has been queried by selecting the associated query icon 408, the query results appear as a value for the bioreactor in the field 406. For example, the value indicates the specific bioreactor used with the batch S0606, e.g., having serial number SB3202. In another embodiment, the query may result in an error message. For example, FIG. 11D shows a status window 412 displayed on the window 404 for querying parameters. In this example, the status window 412 shows batch query results. In this example, the status window 412 indicates an error with the query. For example, a query may result in an error message when there is insufficient data (e.g., insufficient process parameter data or measured parameter data such that not all query parameters have associated values).

Figure 12B:
FIG. 12B shows the window of FIG. 12A with a pop-up window for editing query parameter values for dynamic query parameters tested in the query.
Figure 12C:
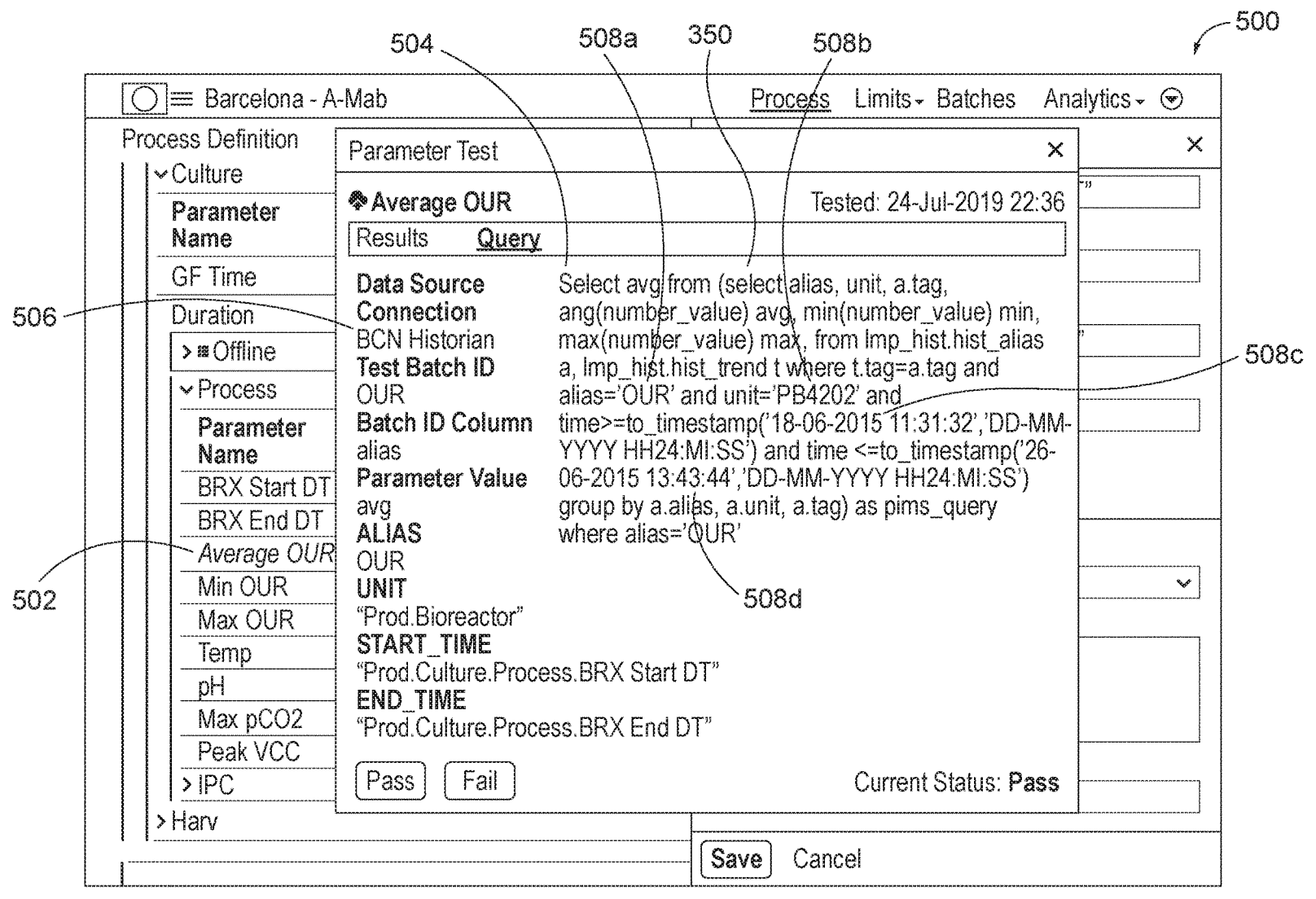
Figure 12D:
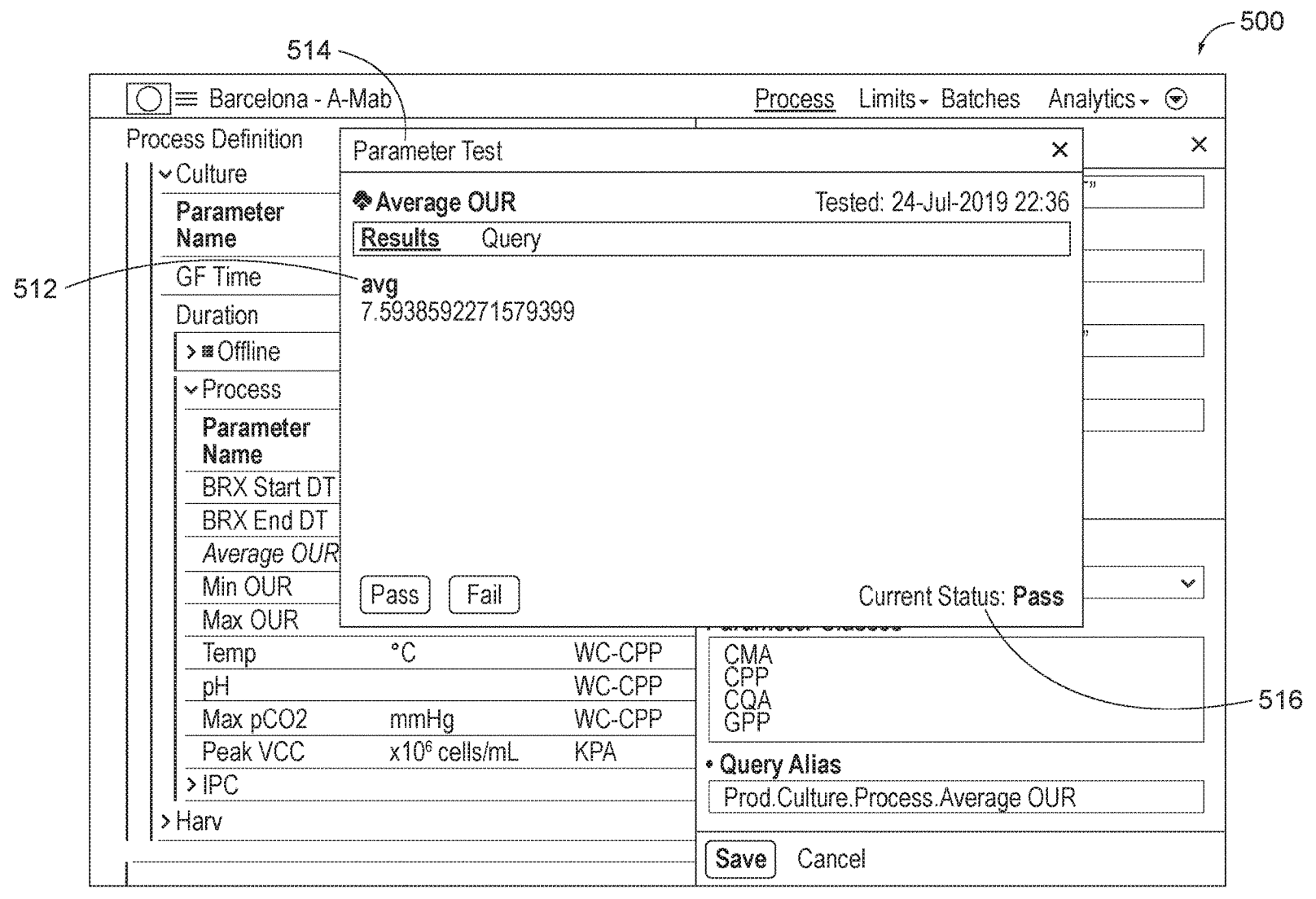

FIGS. 12A-D show an exemplary window 500 displayed on a graphical user interface for testing a query in accordance with the method 300 of FIG. 6. For example, as shown in FIG. 12A, the batch query selected at operation 302 is the parameter Average OUR 502. As shown in FIG. 12C, the parameter Average OUR 502 is associated with a query 504 associated with the data source 506 BCN Historian. As shown, the query 504 incorporates the query 350 titled BCN Historian Summary 352, as shown in FIG. 8 stored as a data source query 324. The associated query 504 function selects an average from the query parameters listed. At operation 304 of method 300 of FIG. 6, at least some of the query parameter values 508a-d are pulled from the data entries input by a user in the query placeholder fields 510, as shown in FIG. 12B. As shown in FIGS. 8 and 12C, the query parameter values 508a-d are input into the query in place of the dynamic parameters indicated in brackets (e.g., placeholder parameters). When the query is executed at operation 306 of method 300 of FIG. 6, the system analyzes collected or measured data stored in one or more data sources, e.g., in data source BCN Historian, that satisfies the query. For example, the system may locate measured data that has an OUR value tagged as an alias query parameter, a measured value of PB4202 tagged as a unit query parameter, a measured value of 18-06-2015 11:31:32 tagged as a start_time, and a measured value of 26-06-2015 13:43:44 tagged as an end_time. The system may then average the queried values and, at operation 308 of method 300, deliver the batch query results as an average 512 displayed (e.g., in a pop-up window 514) in the window 500 on the graphical user interface, as shown in FIG. 12D. In this example, because the query 504 test resulted in an average 512 value, the status 516 is indicated as a PASS; however, if the query 504 resulted in an error (e.g., due to insufficient data for the query), then the status 516 would be indicated as a FAIL.

Figure 13A:
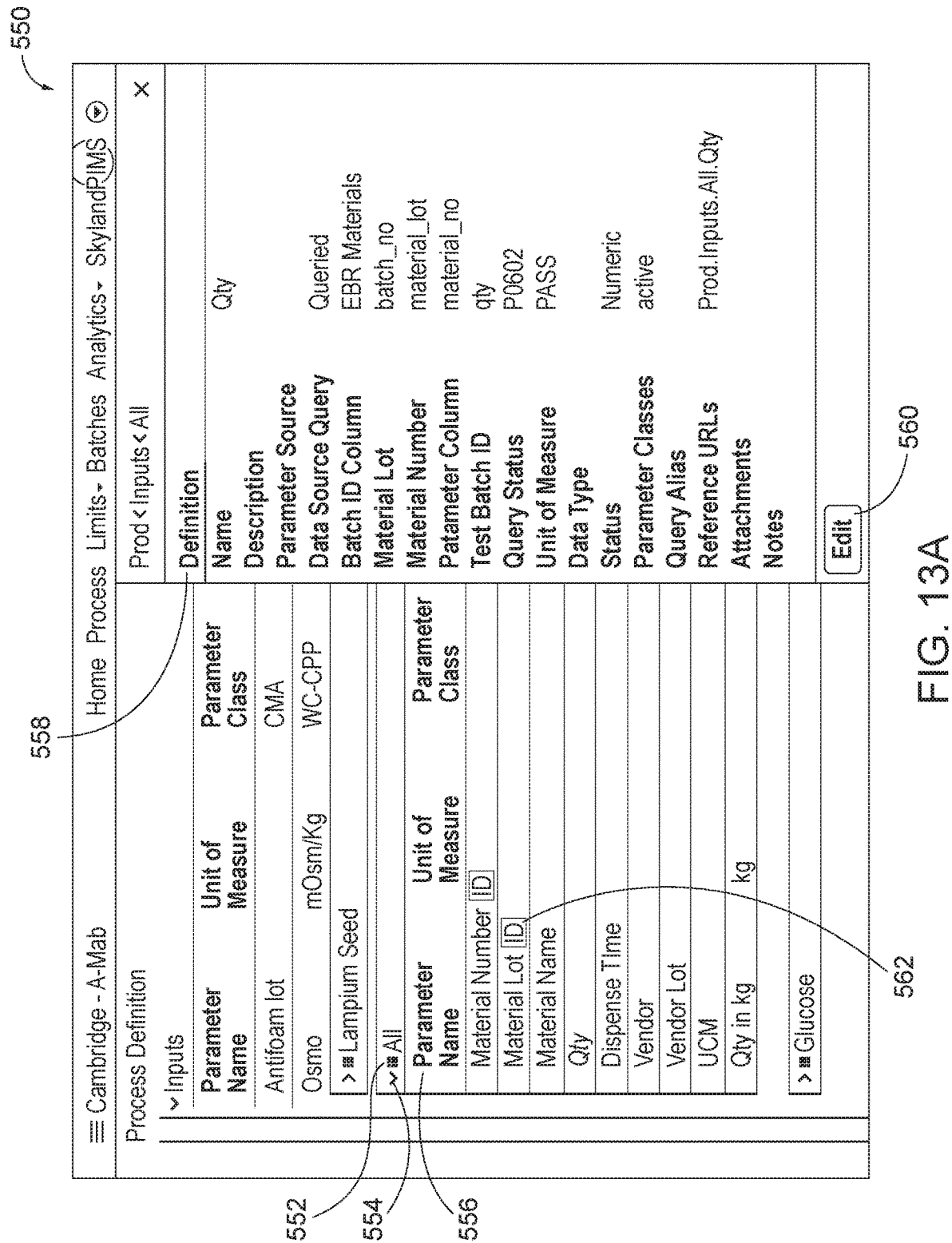
FIG. 13A shows an exemplary window on a graphical user interface for querying multiple parameters.
Figure 13C:
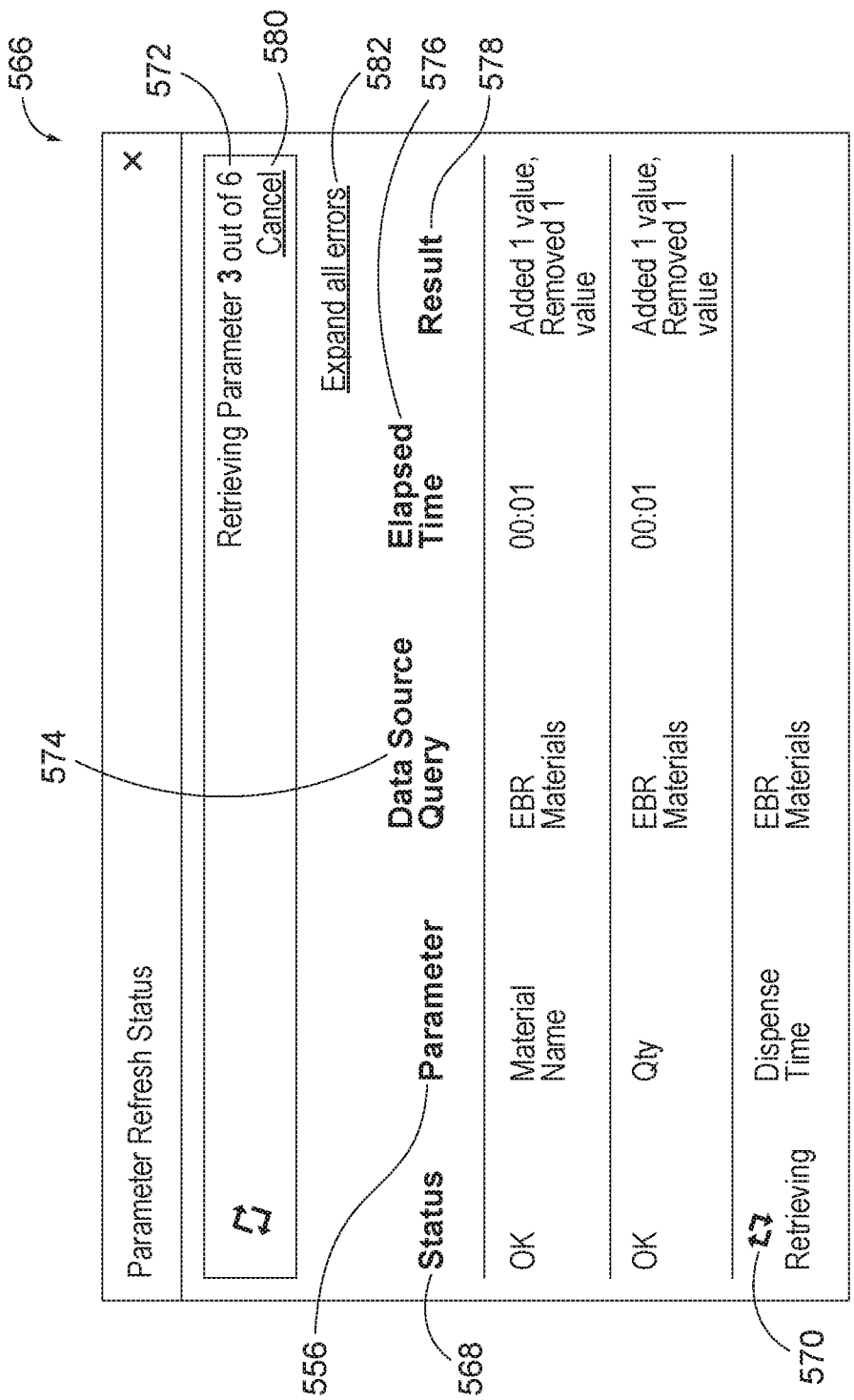
FIG. 13C shows an exemplary window displayed on a graphical user interface for monitoring query execution of the parameters selected using the window of FIG. 13A.
Figure 14A:
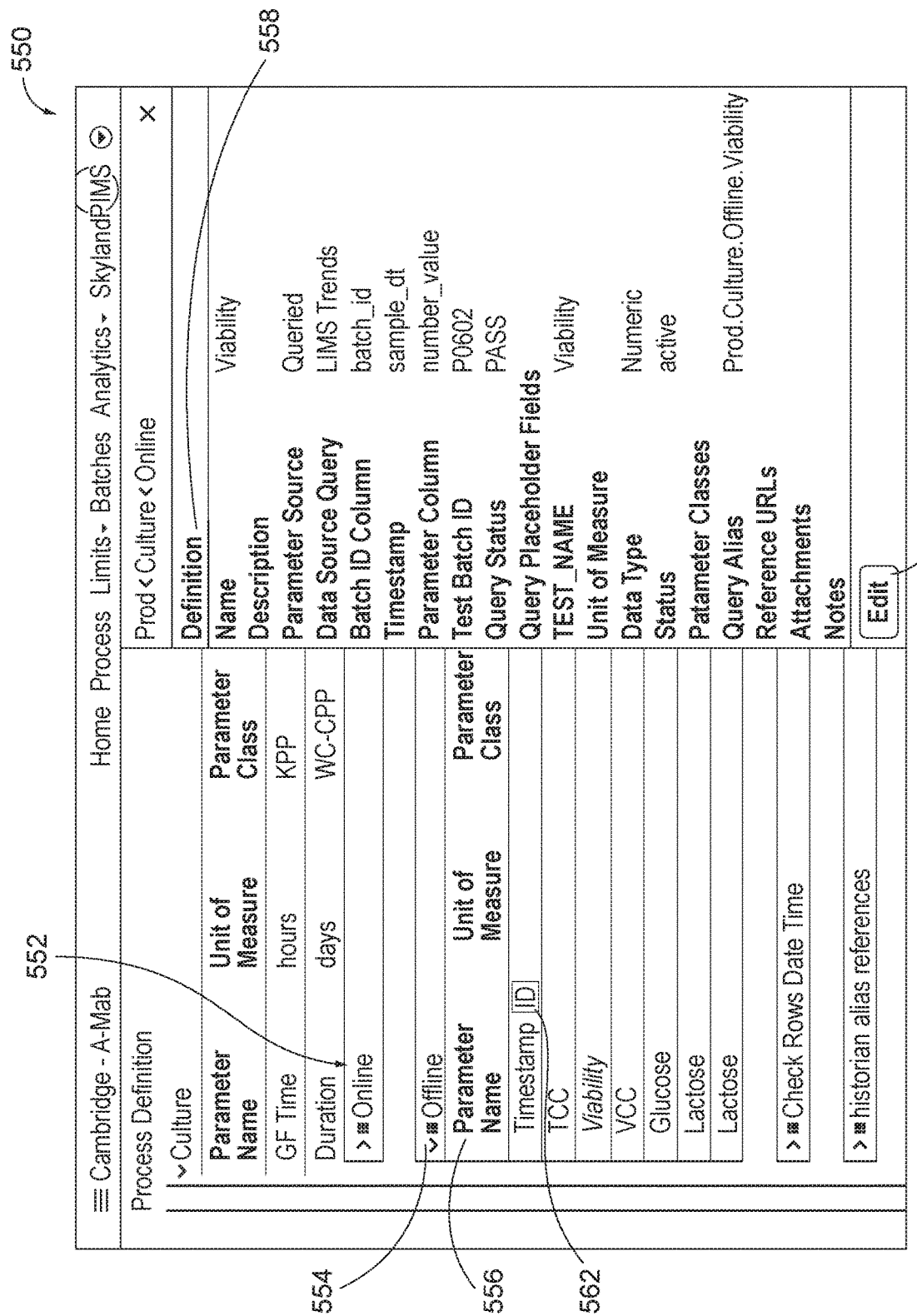
FIG. 14A shows the window of FIG. 13A for querying multiple parameters.

The method 300 of FIG. 6 may also apply to querying multiple parameters together or in sequence (e.g., vector values). For example, FIGS. 13A-D and 14A-D show exemplary windows for querying multiple parameters together. As discussed, at operation 302 of method 300, a batch query selection is received. In these examples, the batch query selection may include two or more selected parameters. For example, FIGS. 13A-B and 14A-B show an exemplary window 550 on a graphical user interface for querying multiple parameters. As shown, various parameter categories 552 may be listed. For example, as shown in FIG. 13B, the window 550 shows parameter categories 552 Lampium Seed, All, Glucose, LMP Salt Mix, Bad convert Test, and Inputs pH. In FIGS. 14A-B, the parameter categories 552 include Online and Offline. With the presented user interface, a user can select a tab 554 on a parameter category 552. Upon receiving user selection of the tab 554, the system displays a dropdown list of parameters 556 associated with the category 552. The user may select the parameters 556 to query together. For example, as shown in FIG. 13A, parameters 556 Material Number, Material Lot, and Qty have been selected, and in FIG. 14A, parameters 556 Timestamp and Viability have been selected. Based on the user's parameter selection, the system displays a visual indicator or identifier, such as a selected icon 562, next to the selected parameter 556 such that the user can easily identify the parameter 556 selected, for example to be queried.

When the system receives a parameter 556 selection (e.g., Qty in FIG. 13A and viability in FIG. 14A), such as by a user clicking on the parameter 556 displayed on the user interface, the system may retrieve the parameter definition for the selected parameter 556 and display the parameter definition in a definition window 558. A user may optionally edit the parameter definition via an edit button 560 in the definition window 558. After receiving the parameters 556 selection within the parameter category 552, the system may query the selected parameters 552 by querying the parameter category 552. For example, as shown in FIGS. 13B and 14B, a user can select a query icon 564 located adjacent the parameter category 552 to instruct the system to query the parameter category 552. For example, as shown in FIG. 13B, when the system receives a selection of the query icon 564 next to the All parameter category 552, the system determines the All parameter category 552 parameters 556 selected, e.g. in FIG. 13A (Material Number, Material Lot, and Qty), and queries the selected parameters 556 in the All parameter category 552 based on the single query request. As another example, as shown in FIG. 14B, when the system receives a selection of the query icon 564 next to the Offline parameter category 552, the system determines the Offline parameter category 552 parameters 556 selected, e.g. in FIG. 14A (Timestamp and Viability), and queries the selected parameters 556 in the Offline parameter category 552 based on the single query request. In some embodiments, if the system receives a query request for a parameter category 552 (e.g., based on receiving a selection of the query icon 564 next to the parameter category 552) and determines that no parameters 556 are selected within the category 552, the system may query all parameters 556 within the parameter category 552.

As discussed with respect to FIG. 6, after operation 302, the method 300 proceeds to operation 304 and batch data values for the query parameters are determined using associated tags. In this example, with multiple parameters there may be multiple associated tags. As discussed above, the system analyzes measured parameters and their associated values from the respective source to determine batch data values for query parameters based on the associated tags. In the example shown in FIGS. 13A-B, the queried process parameter 556 Qty may have been previously tagged with query parameter Qty, the queried process parameter 556 Material Number may have been previously tagged with query parameter Material Number, and the queried process parameter 556 Material Lot may have been previously tagged with query parameter Material Lot. The measured Qty, Material Number, and Material Lot for batch P0618 may also be tagged with query parameters Qty, Material Number, and Material Lot, respectively. To determine the batch values for the queried process parameters Qty, Material Number, and Material Lot, the system determines the values for the measured Qty, Material Number, and Material Lot parameters having the same Qty, Material Number, and Material Lot tags, respectively.

After operation 304, the method 300 proceeds to operation 306 and a query function is executed using batch specific values. FIGS. 13C and 14C show an exemplary window 566 on a graphical user interface for monitoring query execution. As shown in FIGS. 13C and 14C, the system may execute queries for each parameter 556 in sequence. For example, as shown in FIG. 13C, six parameters are queried by the system, with the queries of the first two parameters 556 Material Name and Qty completed, as indicated by the Status 568 "OK", and the query of the third parameter 556 Dispense Time in process, as indicated by the Retrieving icon 570 and the query status update 572. In the depicted example, the queries are executed by the system substantially simultaneously (1 second or less); however, it is also contemplated that the queries may be executed simultaneously by the system.

As another example, as shown in FIG. 14C, seven parameters are queried by the system, with the query of the first parameter 556 Agitation completed, as indicated by the Status 568 "OK", and the query of the second parameter 556 Flow Rate in process, as indicated by the Retrieving icon 570 and the query status update 572. The other parameters 556 OUR and Temp are being queued by the system, as indicated by the Status 568 "Queueing", for quick retrieval as the second parameter 556 Flow Rate is being queried. In this example, the queries are executed by the system substantially simultaneously (30 seconds or less); however, it is also contemplated that the queries may be executed simultaneously by the system.

The system may execute the queries for the multiple parameters in a similar manner as discussed above with respect to a single process parameter (e.g., glucose). For example, as shown in FIG. 8, the query function may select various data to organize for display (e.g., by grouping data), perform a calculation (e.g., average, sum, etc.), or the like. For example, a first parameter may be queried by determining a query parameter associated with the first parameter based on the first parameter's associated tag. The system may determine a measured parameter and its associated value based on the query parameter and the measured parameter's associated tag. The system may execute a query function associated with the query parameter and using the associated measured parameter value. The system may perform the same steps for a second parameter. In some embodiments, the system may apply different query functions for different parameters; however, it is also contemplated that the system may execute the same query function for different parameters. In the example depicted in FIG. 13C, when the process parameter Material Name is queried, Material Name may be input into a generic query. The system may analyze the measured query parameters for measured query parameters tagged as Material Name. If the query function selects and groups data for display, the query function may return the data values associated with the measured parameter tagged with Material Name. The same query execution process may be executed for Qty and Dispense Time.

As shown in FIGS. 13C and 14C, the system may display other information in the query execution monitoring window 556 related to the queried parameters. For example, as shown, the system may display in the query execution monitoring window 556 the data source of the query 574, the time elapsed 576 (e.g., for query execution), and the query result 578. A user can cancel query execution by selecting the cancel link or button 580, which instructs the system to stop future querying of the remaining parameters 556 in the query queue (e.g., Dispense Time in FIG. 13C or Flow Rate, OUR, and Temp in FIG. 14C). A user may further select the Expand all errors link or button 582, which instructs the system to display query errors.

After operation 306, the method 300 proceeds to operation 308 and the batch query results are delivered. For example, the system may deliver the batch query results as a table, having a number of rows determined by the number of results that are returned by the queries. In this example, the table is dynamically created based on the rows of data available (e.g., as determined by the queries). In this manner, the number of rows can vary from batch to batch. In some instances, the table size may be limited (e.g., to a particular number of rows, e.g., 100 rows per parameter); however, it is contemplated that the number of rows may be unlimited.

As one example, as shown in FIG. 13D, after the system queries the process parameters 556 Material Number, Material Lot, Material Name, Qty, Dispense Time, Vendor, and Vendor Lot based on receiving the selection of the associated query icon 564 to query pre-selected parameters in the "All" parameter category 552, the system displays the query results as a table of values or a query results table 584 for the selected parameters 556. For example, as shown, the system displays the parameters 556 as columns within the query results table 584 with values populating each row based on the query results. As discussed, the table values may be measured values for a particular batch that are associated with the same tags associated with the respective parameters 556. For example, as shown in FIG. 13D, the first set of results in row 2 indicate that for Batch ID P0618, Material Number SBRX3457 for Material Lot S0613 is associated with Material Name LAMPIUM_SEED having a Qty of 241.0 and a Dispense Time of 2015-08-18 15:49 and is associated with Vendor Internal and Vendor Lot S0613. The system may display a status 586 for the query results. For example, as shown, each query result has a "Draft" status 586. The draft status is a row-level status, which indicates the user has not submitted the batch data. The draft status indicates that a user may enter additional data in data entry parameters after the queried parameters are populated in the table, prior to submitting/approving the batch data. While the queried data in the table is approved, the table may include additional non-queried parameters (e.g., for data entry or for pre-defined "derived" calculations).

As another example, as shown in FIG. 14D, after the system queries the process parameters 556 Timestamp, Agitation, Flow Rate, and OUR based on receiving the selection of the associated query icon 564 to query pre-selected parameters in the "Offline" parameter category 552, the system displays the query results as a table of values or query results table 584 for the selected parameters 556. As shown in FIG. 14D, the first set of results in row 2 indicate that for Batch ID P0618, at Timestamp 2015-06-18 17:38, the Agitation value was about 255.75, Flow Rate value was about 6.76, and OUR value was about 7.88. The status 586 for each query result in this example is "Draft."

As shown by FIGS. 13D and 14D, the query results table 584 may vary based on the selected parameter category 552 and/or the selected parameters 556. For example, as shown in FIG. 13D, the query results are discrete values provided at a single point in time. In this example, the resulting query results table 584 may be referred to as a replicate table. For example, a replicate table may be desirable for viewing discrete batch values for a particular batch run at a set time. For example, the discrete values may be the most recent measured value. As another example, as shown in FIG. 14D, the query results are variable or dynamic values, varying over time, as indicated, for example, by the timestamps recorded over time. In this example, the agitation, flow rate, and OUR are monitored over time. In this example, the resulting query results table 584 may be referred to as a continuous table. For example, a continuous table may be desirable for viewing batch values that vary over time, for example, during processing of a batch run. As one example, the system may receive a query request (e.g., by a user selecting the query icon) to update the query results table 584 with additional timestamped values. As another example, queries may be scheduled at discrete intervals, instructing the system to continuously query the parameters over time, and the continuous table may be continuously updated as the queries are executed by the system.

Figure 15:
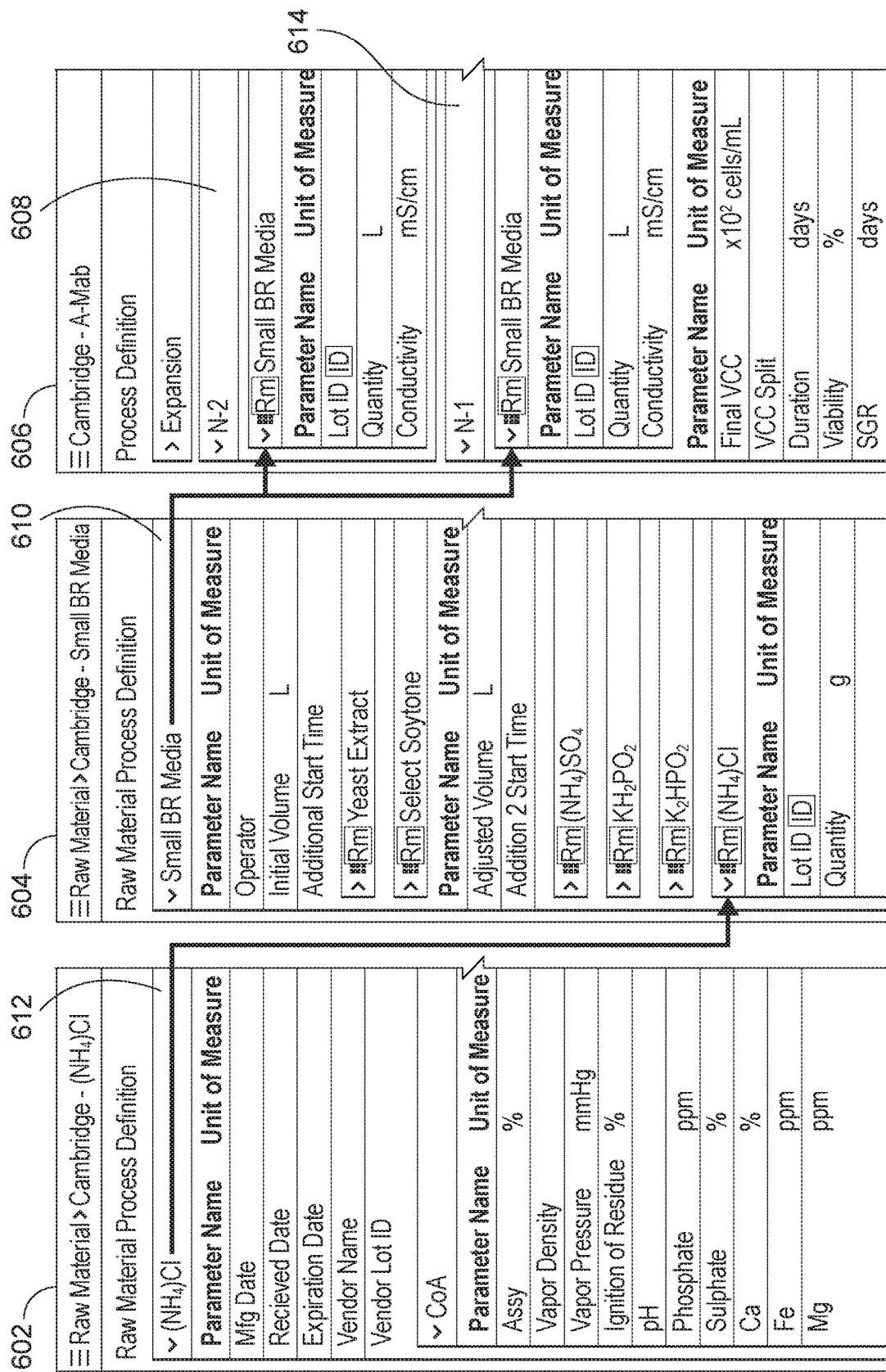
FIG. 15 shows an example window on a user interface showing raw material characteristics and a product process definition.

FIG. 15 shows example windows on a user interface showing raw material characteristics and a product process definition. The raw material characteristics may be used in executing a sub-query during execution of a batch specific query for a material produced using the raw materials. A raw material window 602 shows various characteristics of a raw material batch. An intermediary window 604 shows various characteristics of an intermediary batch including a portion of the raw material batch defined in the first raw material window 602. A product window 606 shows various characteristics of a product including a portion of the intermediary batch 604. Accordingly, a product table 608 of the product window 606 refers back to an intermediary table 610 of the intermediary window 604. Likewise, the intermediary table 610 of the intermediary window 604 refers back to a raw material table 612 of the raw material window 602.

The raw material window 602 generally includes various properties of a lot (e.g., a shipment) of a raw material within a raw material table 612. The raw material table 612 may be implemented as part of a database using the methods described above and the properties, parameters, and lot characteristics stored in the raw material table 612 may be tagged with query parameters as described above. Some properties or parameters may be used to identify the lot, the vendor of the lot, the manufacturer of the lot, etc. For example, the raw material window 602 includes parameters for manufacturing date, received date, expiration date, vendor name, and vendor lot id. These parameters may be helpful, for example, in assuring that raw materials used in a product have not passed an expiration date. Other characteristics may be related to properties of the material itself. For example, the raw material window 602 includes lot characteristics such as vapor density, vapor pressure, pH, phosphate content, and sulfate content. These lot characteristics may be provided by a manufacturer, determined by testing the material in the lot, or a combination.

The intermediary window 604 generally includes various properties of an intermediary within the intermediary table 610. The intermediary table 610 may be implemented as a database using the methods described above. In some implementations, the intermediary may be manufactured using several different raw materials, which may be added at various times in various amounts. Accordingly, the intermediary table 610 may include parameters tracking, for example, the amount of raw material added, the order in which materials were added, start time, reaction time, or which operator oversaw the addition. In some implementations, other physical parameters such as temperature or pressure may be tracked for one or more of the additions. For example, the intermediary table 610 shows a first addition including Yeast Extract and Select Soytone and a second addition including $(NH_4)SO_4$, $KH_2PO_4$, $K_2HPO_4$, and $(NH_4)Cl$.

Generally, the intermediary table 610 incorporates or references a raw materials table for each raw material included in the intermediary. For example, the intermediary table 610 incorporates the raw material table 612 where $(NH_4)Cl$ from the lot defined in the raw material table 612 is used in the intermediary. In some implementations, the intermediary table 610 may reference multiple raw material tables for one raw material. For example, an intermediary may include some $(NH_4)Cl$ from the lot defined in the raw material table 612 and some $(NH_4)Cl$ from a second raw material lot. In such an instance, the intermediary table 610 would incorporate both the raw material table 612 and a second raw material table. To accurately incorporate both raw material tables, the intermediary table may include parameters indicating how much $(NH_4)Cl$ from each lot was ultimately included in the intermediary.

The product window 606 includes a product table 608 storing a process for creating the product as well as product characteristics of a finished product made using the process. The product table 608 may store general information regarding the process such as amounts of types of raw material used to make the product. The product table 608 may be implemented as a database using the methods described above. Information specific to a batch of the product, such as amounts of raw materials or intermediaries from particular lots may also be included. Where a particular lot of raw material or batch of an intermediary is used in a batch of the product, the product table 608 incorporates the respective intermediary or raw material table. For example, the product represented by the product table 608 includes Small BR Media defined in the intermediary table 610. Because the intermediary table 610 incorporates the raw material table 612, the product table 608 recursively incorporates the raw material table 612 when incorporating the intermediary table 610.

In some implementations, the product window 606 may include multiple product tables, where each product table includes information regarding one batch of the product. For example, the product window 606 includes the product table 608 corresponding to one batch of the product and the product table 614 corresponding to another batch of the product. Though the product table 608 and the product table 614 each incorporate the intermediary table 610, in some implementations, product tables may incorporate different intermediary or raw materials tables depending on the batches used in producing the product.

The raw material window 602, the intermediary window 604, and the product window 606 are exemplary and do not include all features or processes contemplated by this disclosure. For example, in some implementations, additional intermediaries may be created in production of a product, such as a second intermediary created using the intermediary represented by the intermediary table 610 and an additional raw material. The product tables 608 and 614 may then incorporate an intermediary table corresponding to the second intermediary, recursively incorporating a raw material table corresponding to the additional raw material, the intermediary table 610, and the raw material table 612.

Figure 16:
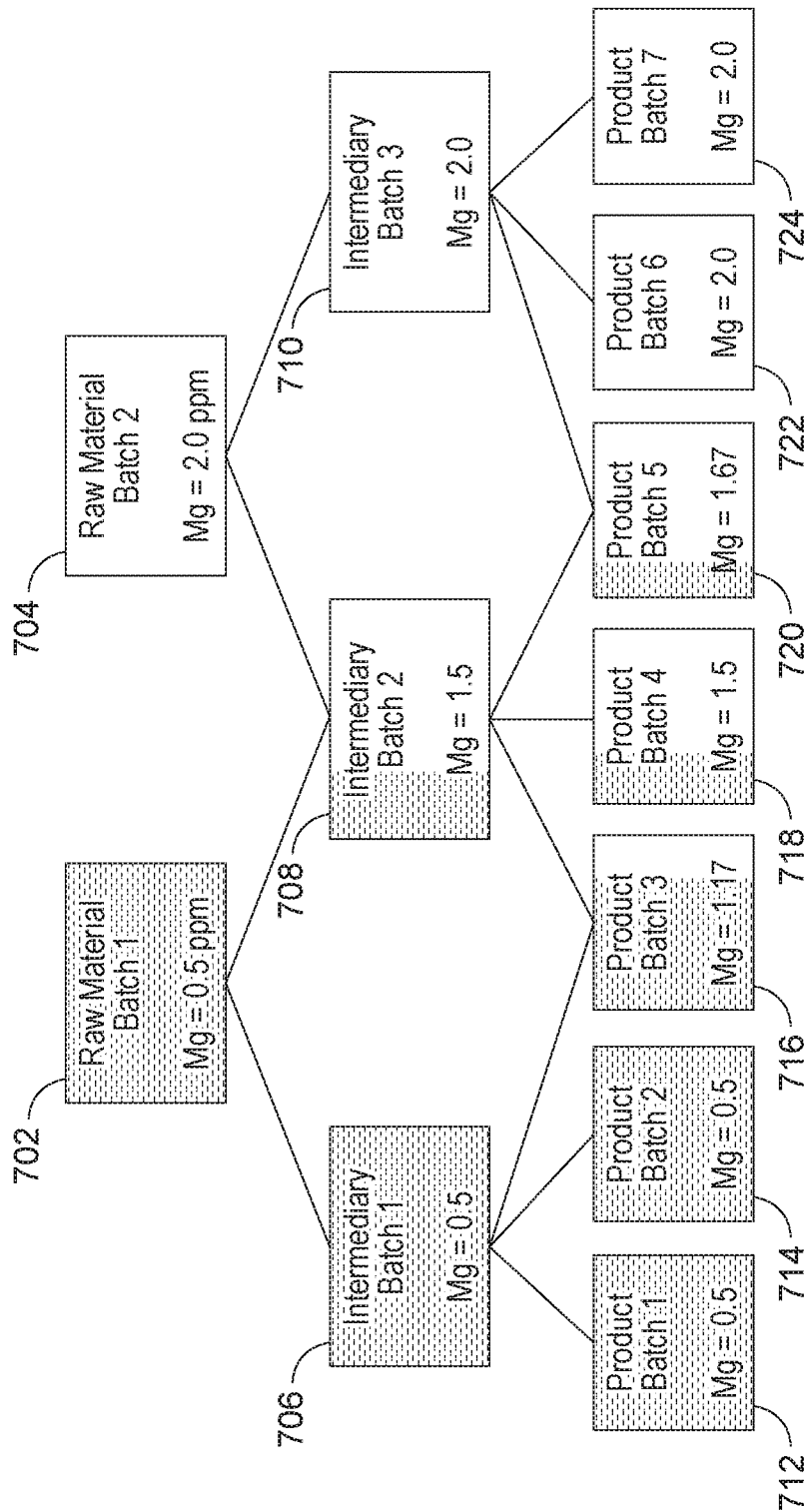
FIG. 16 shows example aggregation of raw material characteristics to determine product characteristics.

FIG. 16 shows example aggregation of raw material characteristics to determine product characteristics. In the example shown in FIG. 16, two batches 702, 704 of a raw material are used in varying amounts in three batches 706, 708, 710 of an intermediary. The three batches 706, 708, 710 of the intermediary are then used in varying amounts in seven product batches 712, 714, 716, 718, 720, 722, 724. While the disclosed system may track numerous types of raw material characteristics, the example shown in FIG. 16 tracks Magnesium (Mg) throughout the process of manufacturing the product. Further, the example process shown in FIG. 16 is exemplary and other contemplated processes may include, for example, multiple types of raw materials, more or fewer intermediaries, more or fewer batches, etc.

In the example shown in FIG. 16, two raw material batches 702 and 704 include different amounts of Mg. The amounts of Mg in the raw material batches 702 and 704 may be stored in raw material tables (e.g., raw material table 612) corresponding to each of the batches. In a next step of the process, an intermediary is created using the raw material. As shown in FIG. 16, the two raw material batches 702 and 704 are used in varying amounts in the intermediary batches 706, 708, and 710. For example, intermediary batch 706 includes raw material from the batch 702. Accordingly, the amount of Mg present in the intermediary batch 706 is the same as the amount present in the raw material batch 702. Similarly, the intermediary batch 710 includes raw material from the batch 704 and has the same amount of Mg as the raw material batch 704.

Intermediary batch 708 includes raw material from both raw material batch 702 and raw material batch 704, so the amount of Mg present in or the percentage of Mg added to intermediary batch 708 is dependent on the Mg content of the batches 702 and 704 and the amount of raw material used in the intermediary batch 708 from each of the batches 702 and 704. Accordingly, an intermediary table correlating to the intermediary batch 708 incorporates and references raw material tables corresponding to the raw material batches 702 and 704. The amount of Mg present in the intermediary batch 708 may accordingly be determined by tracking the amount of raw material from the batches 702 and 704 added to the intermediary batch 708 and referencing raw material tables corresponding to the batches 702 and 704. In some implementations, the amount of Mg (or another substance) present in the intermediary batch 708 is less relevant, and the percentage of Mg added to the intermediary batch 708 is tracked to determine how much was used in generating the final product. For example, in some implementations, Mg may be consumed or transformed during production of the intermediary batch 708, and, accordingly, the intermediary batch 708 would not contain Mg.

The intermediary batches 706, 708, and 710 are added to the product batches 712, 714, 716, 718, 720, 722, and 724 in varying amounts. As the intermediary batches 706, 708, and 710 are added to the product batches 712, 714, 716, 718, 720, 722, and 724, product tables corresponding to the product batches incorporate intermediary tables corresponding to any intermediary batches included in the product. The product tables also generally include the volume of intermediary added to the product from each batch. A determination of the amount of Mg in a given product batch may then be made recursively, using the intermediary tables and raw material tables for the various batches and/or lots used in production of the product.

For example, a query may be delivered to the database including the product table corresponding to the product batch 716 for the amount of Mg in the product batch 716. To fulfill the query, the database may first query the product table corresponding to the product batch 716. The product table corresponding to the product batch 716 then looks to the intermediary tables corresponding to the intermediary batches 706 and 708 and then to the raw material tables corresponding to the raw material batches 702 and 704. The amount of Mg in each of the raw material batches 702 and 704 may then be used, along with the amounts of each of the raw material batches 702 and 704 present in the product batch 716 to calculate the amount of Mg in the product batch 716.

Using the described structure of raw material tables, intermediary tables, and product tables, material characteristics recorded for the raw materials may be calculated for the final products including the raw materials, taking into account batching, mixing, and splitting that may occur during a manufacturing process. Further, the structure may be used for any number of processes and may track raw material batches that are ultimately used in more than one product. It should be noted that the calculations of the raw materials are not based on whether those raw materials are present in their original form in the final product, but rather the amount or percentage of the raw materials that were added to form the final product.

Figure 17:
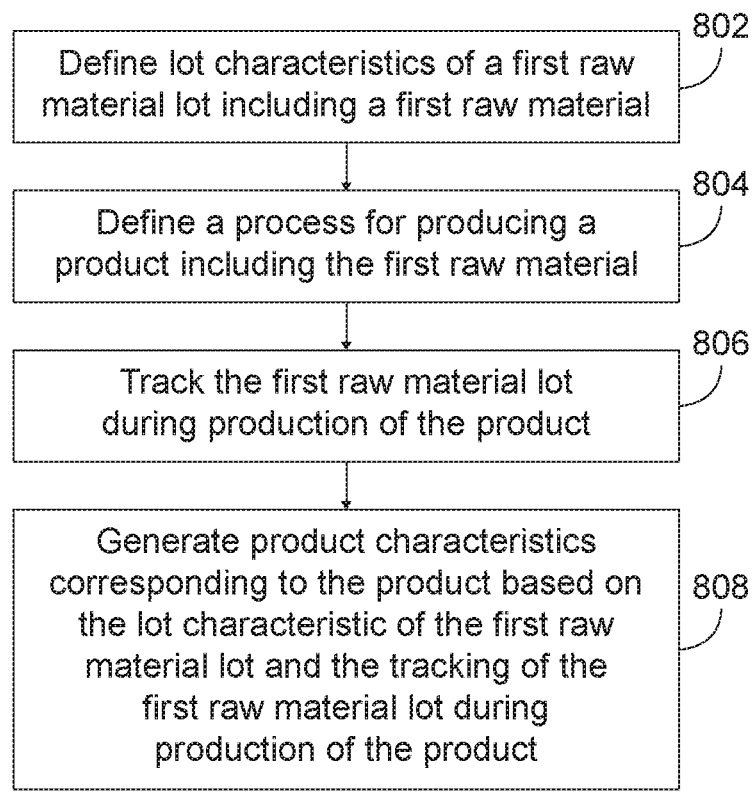
FIG. 17 is a flow chart illustrating a method of tracking a raw material lot characteristic through production to determine a product characteristic.

FIG. 17 is a flow chart illustrating a method 800 of tracking a raw material lot characteristic through production to determine a product characteristic. A first defining operation 802 defines lot characteristics of a first raw material lot including a first raw material. The first defining operation 802 may include transferring, entering, or uploading lot characteristics of the first raw material lot to a raw material table 612. In some implementations, a user interface may display the raw material window 602 and a user may directly enter lot characteristics into the raw material table. Alternatively or additionally, some lot characteristics may be imported to the raw material table 612 via a user interface displaying the raw material window 602. For example, some lot characteristics may be determined by the manufacturer and may be available to download or import to the raw material table 612. In some implementations, the entirety of the raw material table 612 may be provided by the manufacturer.

In some implementations a raw material template may be provided and the raw material table 612 may be generated by importing provided raw material characteristics into the provided template. For example, a lot of raw material may include a label with raw material characteristics. The raw material characteristics may be imported to a template by scanning the label for a QR code, RFID tag, or bar code, or by using other techniques such as optical character recognition (OCR) of information on the label. Templates may be specific to, for example, a type of raw material, such that each lot of the raw material uses the same template to generate a raw material table.

A second defining operation 804 defines a process for producing a product including the first raw material. The second defining operation 804 may, in some implementations, occur before the first defining operation 802. For example, a process for a pharmaceutical produced by a manufacturer may be defined broadly before receipt of raw materials included in the process. For example, using the process defined in product window 606, a process definition may include each of the steps and materials used in the production of A-Mab. The process definition would include an amount of small BR media included in the A-Mab and the amount of $(NH_4)SO_4$, $KH_2PO_4$, $K_2HPO_4$, and $(NH_4)Cl$ used in producing the small BR media.

In some implementations, the second defining operation 804 may result in the creation of intermediary tables (e.g., intermediary table 610) and raw materials tables (e.g., raw material table 612) for materials used in the process. In other implementations, the second defining operation 804 may incorporate already existing intermediary tables, raw materials tables, or templates for raw materials tables. The intermediary tables 610 and the raw materials tables 612 are generally data structures that include characteristics of an intermediary and a raw material, respectively. The intermediary table 610 may include references to data in a raw materials table, such that characteristics of the intermediary are determined with reference to the raw materials table 612.

An optional third defining operation defines a process for creating an intermediary created during the process defined in the second defining operation 804. Accordingly, the optional third defining operation may occur as part of the second defining operation 804. Depending on the number of intermediaries created in a given process, the second defining operation 804 may include any number of defining operations for intermediaries.

A tracking operation 806 tracks the raw material lot during production of the product. For example, the tracking operation 806 may include recording the amount of raw material from the raw material lot added to one or more intermediary batches and the amount of the one or more intermediary batches added to the product. Records made during the tracking operation 806 may be added to the database. For example, where two batches of a first and second lot of raw materials are used in manufacturing an intermediary, the amount of the first lot and the amount of the second lot may both be recorded in an intermediary table for that intermediary. When the intermediary is used in creating a product, the amount of the intermediary added to the product may be recorded in a product table for the product.

Accordingly, the tracking operation 806 may determine how much raw material from the raw material lot is included in the product or batches of the product. In some implementations, other tracking parameters, such as reaction temperature, mixing time, cooling time, or batch storage may be tracked throughout the process. Tracking parameters, including the amount of raw material from the raw material batch, may be added to intermediary tables and the product table as part of the tracking operation 806.

The tracking operation 806 may be automated by one or more measuring instruments communicatively connected to the computing system implementing the product table. In other implementations, tracking parameters may be partially or entirely manually collected and then transmitted to the computing system implementing the product table. In some implementations, several tracking operations may occur in parallel, tracking additional lots of the raw material during production of the product and/or additional raw materials and lots of those raw materials included in the product.

A generating operation 808 generates a product characteristic corresponding to the product based on the lot characteristic of the first raw material lot and the tracking of the first raw material lot during production of the product. The generating operation 808 may occur responsive to a query for a product characteristic of the product. The generating operation 808 may use the product table to determine the product characteristic. The tracking operation 806 may include recording the amount of raw material from the raw material lot ultimately included in the product. To determine the lot characteristic (e.g., the amount of Mg in a lot of raw material in FIG. 16), the product table may direct the query to an intermediary table, which may then direct the query to the raw material table directly for the lot characteristic. In some implementations, the lot characteristic may be adjusted for the amount of raw material from the lot included in the product.

Where more than one lot of a raw material is included in the product, the generating operation 808 may aggregate the lot characteristic of the first raw material lot with the same lot characteristic of a second (or further) raw material lot to generate the product characteristic. In other implementations, more than one raw material may include a lot characteristic corresponding to the product characteristic. Using the example of FIG. 16, a second raw material including some amount of Mg may be used in manufacturing the product. In these instances, the lot characteristics for any lots of the first raw material may be aggregated further with lot characteristics of lots of the second raw material to generate the product characteristic.

The generating operation 808 occurs without the need to calculate, for example, the amount of Mg used in the intermediary, and eventually using that amount to calculate the amount used in the product. Instead, the system recursively retrieves the original raw materials characteristics from the incorporated raw materials tables and uses tracking values to generate product characteristics, reducing errors which may occur from copying values between databases, spreadsheets, or written records as well as reducing calculations used to generate product information.

CONCLUSION

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. For example, the methods and systems are described herein with reference to querying batch data from a product run or experiment (e.g., drug development); however, these techniques are equally applicable to other uses, such as other scenarios where data integrity is needed or where related data is stored in remote locations. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of querying one or more databases comprising:
   receiving, at a processor, a request to execute, for a specified process, a generic query having a dynamic query parameter;
   determining one or more expected parameters for the query based on the dynamic query parameter and the process, wherein the one or more expected parameters are tagged to the dynamic query parameter for the process;
   accessing, based on the one or more expected parameters, one or more measured parameters from the one or more databases, wherein the one or more databases are accessible by the processor over a network; and
   returning, by the processor, the one or more measured parameters responsive to the request to execute the generic query, wherein accessing the one or more measured parameters comprises aggregating a lot characteristic of a second raw material lot with a lot characteristic of a first raw material lot based on tracking of the first raw material lot and the second raw material lot during the process, wherein the aggregating is based on a recursive determination of the tracking of the first raw material lot and the second raw material lot used during production of the product.

2. The method of claim 1, wherein the generic query is used for at least two processes, the processes having at least one expected parameter that is different, wherein the different expected parameters are tagged to the dynamic query parameter.

3. The method of claim 1, further comprising, prior to receiving the request to execute the generic query:
   receiving, at the processor, the one or more expected parameters corresponding to the process; and
   storing, at a non-transitory memory, an association between the one or more expected parameters and the dynamic query parameter by tagging the one or more expected parameters to the dynamic query parameter for the process.

4. The method of claim 3, wherein the non-transitory memory further stores associations between additional expected parameters and the dynamic query parameter for additional processes.

5. The method of claim 1, wherein the one or more measured parameters are based on data collected during the process.

6. The method of claim 5, wherein the data collected during the process is stored in the one or more databases as the data is collected.

7. The method of claim 1, wherein accessing the one or more measured parameters further comprises:
   retrieving the one or more measured parameters by referencing a product table corresponding to a product manufactured by the process, wherein the product table generates each of the one or more measured parameters based on a raw material parameter corresponding to the measured parameter for one or more raw material lots included in the product and a tracked amount of raw material from the one or more raw material lots included in the product.

8. A method of querying one or more databases over a network comprising:
   receiving, at a processor, a request to execute, for a specified process, a generic query having a dynamic query parameter;
   determining a process parameter for the query based on the dynamic query parameter and the process, wherein the process parameter is tagged to the dynamic query parameter for the process;
   generating a measured parameter corresponding to the process parameter by executing one or more sub-queries associated with the measured parameter during the process using measured data from one or more databases accessible by the processor over the network, wherein the one or more sub-queries access measured data associated with a lot characteristic of a first raw material lot and a lot characteristic of a second raw material lot, wherein the first raw material lot and the second raw material lot are used for production of a product using the process, wherein executing the one or more sub-queries comprises aggregating the lot characteristic of the second raw material lot with the lot characteristic of the first raw material lot based on tracking of the first raw material lot and the second raw material lot during the process; and
   returning, by the processor, the measured parameter responsive to the request to execute the generic query, wherein aggregating the lot characteristic of the second raw material lot with the lot characteristic of the first raw material lot comprises:
      adjusting the lot characteristic of the second raw material lot based on an amount of raw material from the second raw material lot used during production of the product; and
      adjusting the lot characteristic of the first raw material lot based on the amount of raw material from the first raw material lot used during production of the product.

9. The method of claim 8, wherein the one or more sub-queries access measured data associated with a lot characteristic of a raw material lot used for production of a product using the process.

10. The method of claim 9, wherein executing the one or more sub-queries comprises aggregating the lot characteristic of the raw material lot based on tracking of the raw material lot during the process.

11. The method of claim 10, wherein the tracking of the raw material lot during the process tracks an amount of raw material from the first raw material lot used in the process.

12. One or more non-transitory computer readable media including instructions which, when executed by one or more processors of a computing device, cause the computing device to:
   determine, responsive to a request to execute a generic query for a process, a first measured parameter for the process corresponding to a first query parameter of the generic query and a second measured parameter for the process corresponding to a second query parameter of the generic query;
   access a first value associated with the first measured parameter;
   execute a first query function associated with the first query parameter based on the first value associated with the first measured parameter;
   access a second value associated with the second measured parameter;
   execute a query function associated with the second query parameter based on the second value associated with the second measured parameter; and
   display a query result based on the execution of the first query function and the execution of the second query function,
   wherein accessing the first value associated with the first measured parameter and the second value associated with the second measured parameter comprises aggregating a lot characteristic of a second raw material lot with a lot characteristic of a first raw material lot based on tracking of the first raw material lot and the second raw material lot during the process, wherein the aggregating is based on a recursive determination of the tracking of the first raw material lot and the second raw material lot used during production of the product.

13. The one or more non-transitory computer readable media of claim 12, wherein the query result is a replicate table comprising values collected at a discrete moment in time.

14. The one or more non-transitory computer readable media of claim 12, wherein the query result is a continuous table comprising values collected over time.

15. The one or more non-transitory computer readable media of claim 12, wherein the first query function performs a calculation using the first value associated with the first measured parameter.

16. The one or more non-transitory computer readable media of claim 12, wherein the first query function and the second query function are the same functions.

17. The one or more non-transitory computer readable media of claim 12, wherein accessing the first value and accessing the second value comprises accessing one or more databases in communication with the one or more processors.

* * * * *